United States Patent
Schultz et al.

(10) Patent No.: US 10,992,664 B2
(45) Date of Patent: *Apr. 27, 2021

(54) BIOMETRIC DATA HASHING, VERIFICATION AND SECURITY

(71) Applicant: Case Wallet, Inc., Rochester, NY (US)

(72) Inventors: Stephen L. Schultz, West Henrietta, NY (US); David R. Nilosek, Rochester, NY (US); John Dvorak, West Liberty, IA (US)

(73) Assignee: Tokenize, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/940,115

(22) Filed: Mar. 29, 2018

(65) Prior Publication Data
US 2018/0219861 A1 Aug. 2, 2018

Related U.S. Application Data

(63) Continuation of application No. 15/269,554, filed on Sep. 19, 2016, now Pat. No. 9,935,948.
(Continued)

(51) Int. Cl.
*H04L 29/06* (2006.01)
*G06F 21/32* (2013.01)
(Continued)

(52) U.S. Cl.
CPC .......... *H04L 63/0861* (2013.01); *G06F 21/32* (2013.01); *G06K 9/001* (2013.01);
(Continued)

(58) Field of Classification Search
CPC . H04L 63/0861; H04L 9/3231; H04L 9/3236; G06F 21/32
(Continued)

(56) References Cited

U.S. PATENT DOCUMENTS 4,747,147 A * 5/1988 Sparrow ............ G07C 9/00158
382/125
5,465,303 A * 11/1995 Levison ............... G06K 9/0008
382/124
(Continued)

FOREIGN PATENT DOCUMENTS

WO 2015/183497 12/2015

OTHER PUBLICATIONS

Fronthaler, Local Features for Enhancement and Minutiae Extraction in Fingerprints, 2008, IEEE, vol. 17, No. 3, pp. 354-363. (Year: 2008).*

(Continued)

*Primary Examiner* — Samson B Lemma
*Assistant Examiner* — Abdullah Almamun
(74) *Attorney, Agent, or Firm* — Dunlap Codding, P.C.

(57) ABSTRACT

A fingerprint identification system comprising a smart device, a fingerprint scanner, a processor coupled to a transceiver and to the fingerprint scanner, and a digital storage element coupled to the processor. The digital storage element stores logic that causes the processor to: activate the fingerprint scanner to scan a user's finger, identify a feature and multiple minutia of the user's fingerprint, and generate a digital fingerprint string(s) indicative of a position of each minutia relative to the feature. The processor is then caused to combine the digital fingerprint string(s) with a first cryptographic salt to generate a first hash. The first hash is compared to a first hash signature to determine if the first hash represents an authentic fingerprint. If authentic, the processor combines the digital fingerprint string(s) with a second cryptographic salt to generate a second hash. This second hash is transmitted to one or more servers.

18 Claims, 10 Drawing Sheets

Related U.S. Application Data

(60) Provisional application No. 62/220,695, filed on Sep. 18, 2015, provisional application No. 62/272,177, filed on Dec. 29, 2015.

(51) Int. Cl.
*H04L 9/32* (2006.01)
*G06K 9/00* (2006.01)
*G06K 9/22* (2006.01)

(52) U.S. Cl.
CPC ..... *G06K 9/00026* (2013.01); *G06K 9/00067* (2013.01); *G06K 9/00087* (2013.01); *G06K 9/00093* (2013.01); *G06K 9/228* (2013.01); *H04L 9/3231* (2013.01); *H04L 9/3236* (2013.01); *G06K 2009/00953* (2013.01)

(58) Field of Classification Search
USPC .......................................................... 713/186
See application file for complete search history.

(56) References Cited

U.S. PATENT DOCUMENTS

| | | | | |
|---|---|---|---|---|
| 7,366,328 | B2* | 4/2008 | Hamid | G06K 9/00046 340/5.52 |
| 8,055,277 | B2 | 8/2011 | Tulyakov et al. | |
| 8,249,314 | B2* | 8/2012 | Bolle | G06K 9/00073 382/115 |
| 8,824,746 | B2* | 9/2014 | Abe | G06K 9/036 382/115 |
| 9,350,548 | B2* | 5/2016 | Bagley | H04L 9/3242 |
| 9,438,590 | B2* | 9/2016 | Mandal | H04L 63/0861 |
| 2001/0031075 | A1* | 10/2001 | Fujii | G06K 9/00006 382/125 |
| 2002/0018585 | A1* | 2/2002 | Kim | G06K 9/00067 382/125 |
| 2002/0026573 | A1* | 2/2002 | Park | H04L 63/0428 713/155 |
| 2003/0039382 | A1* | 2/2003 | Yau | G06K 9/00073 382/125 |
| 2006/0182317 | A1* | 8/2006 | Neumann | G06K 9/00073 382/124 |
| 2008/0101662 | A1* | 5/2008 | Lo | G06K 9/0008 382/124 |
| 2008/0273770 | A1* | 11/2008 | Kohout | G06K 9/00073 382/125 |
| 2010/0017618 | A1* | 1/2010 | Golic | G06K 9/00288 713/186 |
| 2010/0092048 | A1* | 4/2010 | Pan | G06F 21/32 382/125 |
| 2011/0179289 | A1* | 7/2011 | Guenther | G06F 21/64 713/189 |
| 2011/0216948 | A1* | 9/2011 | Yalla | G06K 9/00006 382/125 |
| 2012/0284284 | A1* | 11/2012 | Bringer | G06K 9/00087 707/748 |
| 2012/0308093 | A1* | 12/2012 | Lemma | G06K 9/00 382/125 |
| 2015/0033301 | A1 | 1/2015 | Pianese et al. | |
| 2015/0180667 | A1* | 6/2015 | Bringer | H04L 9/0816 380/28 |
| 2016/0036811 | A1* | 2/2016 | Shim | G06F 21/6245 726/7 |
| 2016/0306954 | A1* | 10/2016 | Hawkins | G07C 9/00 |
| 2017/0243042 | A1* | 8/2017 | Walch | G06K 9/001 |

OTHER PUBLICATIONS http://www.genkey.com/en/technology/biohashr-sdk, viewed on Sep. 19, 2016.

\* cited by examiner

BIOMETRIC DATA HASHING, VERIFICATION AND SECURITY

INCORPORATION BY REFERENCE STATEMENT

The present application is a continuation of U.S. patent application Ser. No. 15/269,554, filed Sep. 19, 2016, which claims priority to U.S. Provisional Application No. 62/220,695 filed on Sep. 18, 2015, and U.S. Provisional Application No. 62/272,177 filed on Dec. 29, 2015, all of which are hereby expressly incorporated herein by reference in their entirety.

BACKGROUND

1. Field of the Presently Disclosed and/or Claimed Inventive Concepts

The inventive concepts disclosed and claimed herein relate to identity verification security, and more particularly, but not by way of limitation, to systems and methods for improving the security of biometric data access to servers.

2. Brief Description of Related Art

As people look for new ways to improve security for access to central servers, use of biometric data is becoming more and more common. Biometrics is a process by which a person's unique traits, physical or other, are detected and recorded as a means of confirming identity. Features commonly measured include fingerprints, face, hand geometry, handwriting, iris, retina, veins, heart rhythm, and voice. Using a unique, physical attribute of your body, such as your fingerprint or iris, to effortlessly identify and verify that you are who you claim to be, is the best and easiest solution in the market today.

While biometrics provides a unique electronic signature of an individual, it also presents some problems. First, if your fingerprint data, for example, is ever hacked and duplicated, you are not able to change it like you can a password. Thus, all subsequent use of your fingerprint data is subject to spoofing (forgery) once someone has your unique fingerprint signature. Second, multiple scans of a same fingerprint may not be exact for several reasons including fingerprint scans do not always scan the same portion of the finger, and the orientation of the finger relative to the scanner can change. Therefore, an inexact fingerprint scan must be compared to previously stored fingerprint scans in order to determine whether they match. This requires storing the fingerprint scan on the server, which then makes that data vulnerable to server attacks.

The "inexactness" of most scans also prevents hashing the data prior to transmission. Hashing is a common method for securing sensitive data, since once hashed, the data can only be compared in its entirety, not in individual components. However, hashing a biometric scan such as a fingerprint scan would require consistent scan results for comparisons in the entirety to work. If a single minutia is missing from the scan, or an extra found, the comparison of the hashed results will fail.

To compensate for the inexact nature of the biometric scan, the biometric files are quite large. For systems communicating over slower data networks, such as 2G wireless networks, the transmission of these relatively large files can take several seconds, negatively impacting the user experience. It would therefore be desirable to reduce the size of the biometric data communicated, and to use exact biometric data that can be hashed prior to communication. This disclosure proposes a method and system that accomplishes both.

BRIEF SUMMARY

The inventive concepts disclosed and claimed herein relate generally to apparatuses, systems and methods that characterize biometric data, such as a fingerprint scan, using descriptive language that captures the unique qualities of the biometric data while doing so in a manner that has a much smaller data footprint and that results in the same descriptive string for each scan without the need to compare to previous scans. Additionally, by creating a repeatable descriptive string, this information can be treated using industry standard cryptographic hash algorithms and the actual scan never needs to be stored or transmitted, thereby better protecting the sensitive information.

In one embodiment, a fingerprint identification system comprises a fingerprint scanner operably connected to or included within a smart device, the smart device having a processor, and a transceiver and digital storage element coupled to the processor. The digital storage element stores logic, that when executed by the processor, causes the processor to: activate the fingerprint scanner to scan an aspect of a user's physiology, identify a central feature and at least two minutiae of the user's scanned physiology, and generate a digital biometric string(s) indicative of a position of each of the at least two minutiae relative to the central feature. The processor is then caused to combine the digital biometric string(s) with a first cryptographic salt stored in the digital storage element to generate a first hash. The first hash is compared to a first hash signature stored in the digital storage element to determine if the first hash represents an authentic biometric scan. If authentic, the processor is caused to combine the digital biometric string(s) with a second cryptographic salt stored in the digital storage element to generate a second hash. This second hash is transmitted to one or more servers and can be used by the one or more servers to verify the user's identity.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION OF EXEMPLARY EMBODIMENTS

Figure 1:
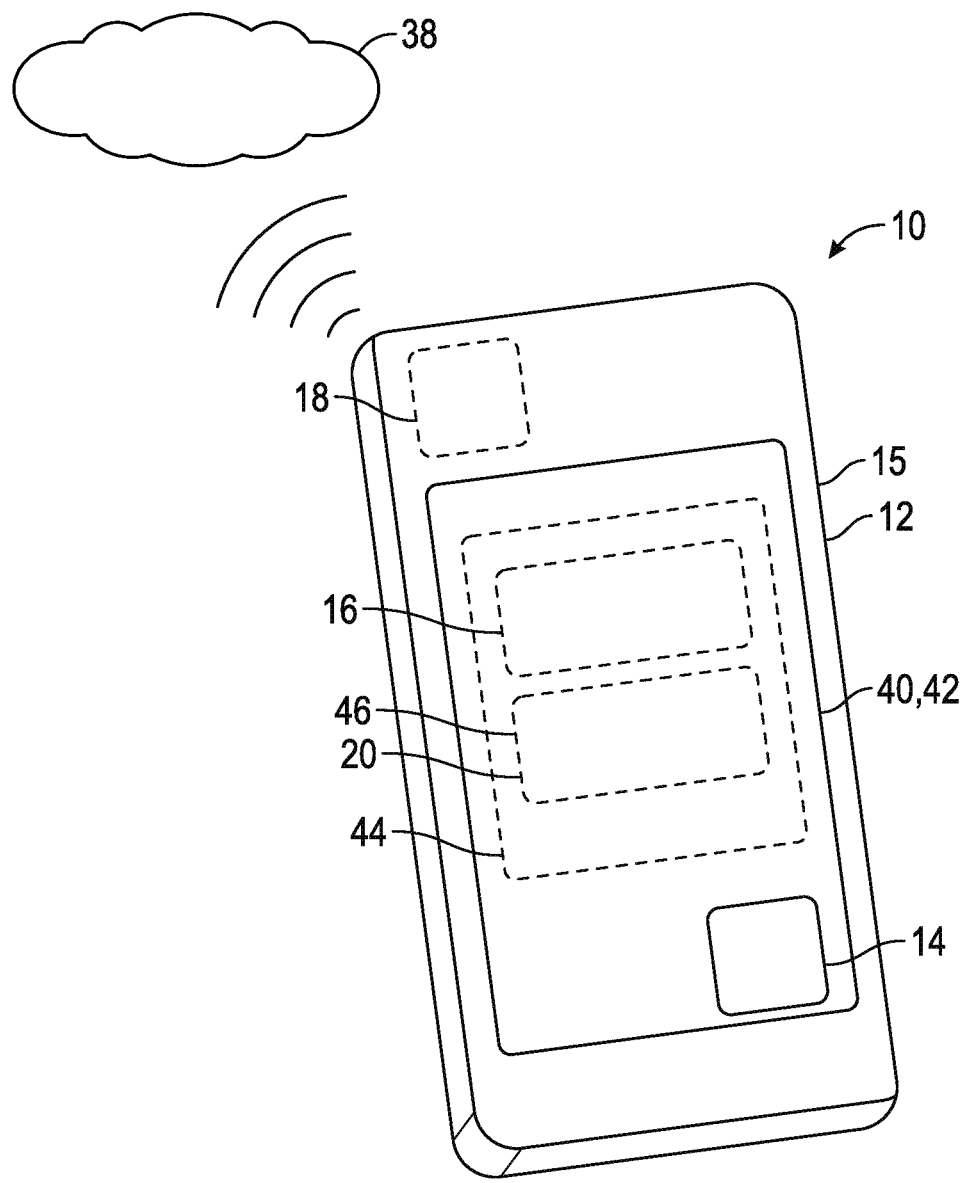
FIG. 1 is a perspective view of an exemplary biometric identification system of the present disclosure.

Before explaining at least one embodiment of the inventive concepts disclosed herein in detail, it is to be understood that the inventive concepts are not limited in their application to the details of construction, exemplary data, and/or the arrangement of the components or steps or methodologies set forth in the following description, or illustrated in the drawings. The presently disclosed and claimed inventive concepts are capable of other embodiments or of being practiced or carried out in various ways. Also, it is to be understood that the phraseology and terminology employed herein is for purpose of description only and should not be regarded as limiting in any way.

Unless otherwise defined herein, technical terms used in connection with the presently disclosed inventive concept(s) shall have the meanings that are commonly understood by those of ordinary skill in the art. Further, unless otherwise required by context, singular terms shall include pluralities and plural terms shall include the singular.

All of the articles and/or methods disclosed herein can be made and executed without undue experimentation in light of the present disclosure. While the articles and methods of the presently disclosed inventive concept(s) have been described in terms of preferred embodiments, it will be apparent to those of skill in the art that variations may be applied to the articles and/or methods and in the steps or in the sequence of steps of the method described herein without departing from the concept, spirit, and scope of the presently disclosed inventive concept(s). All such similar substitutes and modifications apparent to those skilled in the art are deemed to be within the spirit, scope, and concept of the presently disclosed inventive concept(s).

Definitions

As utilized in accordance with the present disclosure, the following terms, unless otherwise indicated, shall be understood to have the following meanings:

The use of the word "a" or "an" when used in conjunction with the term "comprising" in the claims and/or the specification may mean "one", but it is also consistent with the meaning of "one or more," "at least one," and "one or more than one." The use of the term "or" in the claims is used to mean "and/or" unless explicitly indicated to refer to alternatives only or that the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. The term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

The term "associate" as used herein will be understood to refer to the direct or indirect connection of two or more items.

Use of the term "plurality" is meant to convey "more than one" unless expressly stated to the contrary.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "hash function" and "hash algorithm" refer to any function that can be used to map digital data of arbitrary size to digital data of known size. The term "hash" as used herein refers to either the act of using a hash function or to the values returned by the hash function. An exemplary hash function that can be used in accordance with the presently disclosed inventive concepts is SHA-256, which stands for Secure Hash Algorithm Version 2 with a 256 bit digest and was created by the National Security Agency. A description of the SHA-256 algorithm can be found in U.S. Pat. No. 6,829,355 which is hereby incorporated herein by reference.

In cryptography, a "salt" is random data that is used as an additional input to a one-way function that hashes a password or other information. The primary function of a salt is to defend against brute-force attacks to identify the underlying password or other information. Without the use of salts, a hacker, for example, could generate a large table of hashed passwords and just compare them to what is stored in order to find a match. But since each password is hashed with a unique salt, then every password tested must be tried in combination with each salt value, meaning the work cannot be done ahead of time, and furthermore, by making salts significantly complex, then the number of possible salt values that have to be tested makes the brute force method extremely difficult if not virtually impossible.

Inventive Concept(s)

Today, fingerprints are matched by comparing several features of the fingerprint scan. Typically the overall fingerprint pattern is looked at as well as individual minutiae within the overall pattern. Typically, a fingerprint is identified as having one of three overall patterns. An arch pattern occurs where the ridges start on one side of the finger, arch upward, and end on the other side of the finger. A loop pattern occurs where the ridges start on one side of the finger, loop around a central swirl, and end back on the same side of the finger. A whorl pattern occurs where the ridges form a circle around a center swirl. These three main categories are generally further broken down, for example, an arch might be a simple arch or a tented arch. Loops can be categorized by whether they swirl to the right or to the left and whether they have a double loop. Whorls may be categorized as a plain whorl, a pocket whorl, or an accidental whorl. These general patterns are often referred to as "level 1 features."

Minutiae describe anomalies within the ridge patterns. These typically include features such as a ridge terminating, a short ridge, a ridge that bifurcates, a ridge enclosure where a ridge bifurcates and then the resulting two ridges merge back together ("eye"), or a core where a ridge makes a sharp U-turn on itself. These minutiae are often referred to as "level 2 features." Some algorithms even look in finer detail at the minutiae within each ridge, essentially looking for patterns formed by individual pores and the like. These ultra-fine minutiae are often referred to as "level 3 features."

Detailed discussions of industry standard fingerprint minutiae location systems and algorithms are available from the National Institute of Standards and Technology (NIST). The finger print minutia viewer (FPMV) algorithms can be accessed at http://www.nist.gov/itl/iad/ig/fpmv.cfm and are incorporated herein by reference.

Prior art algorithms attempt to locate and categorize the overall pattern and the ridge minutiae (level 1 and 2 features) as many scanners do not have the density or consistency to accurately map the pore minutiae (level 3 features). But even when mapping the pore minutiae, these algorithms take a similar approach. The algorithms capture these minutiae and store them to produce a template of the fingerprint against which new scans are compared. Because each scan rarely contains the same information, a threshold is typically used to determine whether the fingerprint matches. This requires storing the minutiae and other template data in order to compare it to a later scan. Because of the individual comparison of minutiae and patterns, and because a "close enough" methodology is incorporated to overcome the limitations caused by no two scans of the same finger are quite the same, the prior art "fingerprint identification" cannot be hashed and compared. The presently disclosed inventive concepts overcome this deficiency.

Thus, prior art algorithms for fingerprint scanning procedures rely on a "fuzzy logic" to be able to match inexact fingerprint scans. That is, the prior art algorithms, which look at the image of the fingerprint, find some uniquely identifiable features and make sure that enough of the identifiable features match those stored from the original "registration scans" that first record the pattern against which subsequent scans are compared. While these algorithms often produce a template that does not allow a complete recreation of the original fingerprint data, generally enough of the original fingerprint data can be synthesized from the template that a fake fingerprint can be made which can then be used for subsequent authorizations.

In contrast, one embodiment of the presently disclosed inventive concepts uses exact biometric data that can be hashed prior to communication. Referring to FIG. 1, a biometric identification system 10 comprises a smart device 12 operably connected to or including a biometric sensor 14. The smart device 12 includes a housing 15 containing processor 16, a transceiver 18 and digital storage element 20 coupled to the processor 16. The digital storage element 20 stores logic, that when executed by the processor 16, causes the processor 16 to: activate the biometric sensor 14 to scan an aspect of a user's physiology, identify a central feature 22 and at least two minutia 24 of the user's scanned physiology, and generate a digital fingerprint string(s) 26 indicative of a position of each of the at least two minutia 24 relative to the central feature 22. The central feature 22 is a predominant reference point that can be in a central portion of the user's physiology, a point from which more than one radial to the minutia 24 begins (e.g., intersects at least two radials), or can be in between the at least two minutia 24. For example, the central feature 22 can be any one of the following: (a) a focus point of the level one minutiae pattern, such as the center of a swirl pattern, (b) a selected minutiae 24, typically with a stored hint to ensure the selected minutia is selected properly on subsequent scans, (c) a point in the fingerprint found by correlating a stored small snippet of the fingerprint to subsequent scans, (d) a point relative to a selected pattern of three or more minutiae 24, typically the center point, or (e) another feature, either present in the biometric data or that can be generated or overlaid on the biometric data, such that it can be found consistently and repeatedly in subsequent scans. The algorithm can either always attempt to find the same type of central feature 22, or it can use a prioritized list of central features 22 because some types of central features 22 can be absent from some biometric data, for instance, a fingerprint without a focus point of its level one minutiae. The processor 16 is then caused to combine the digital fingerprint string(s) 26 with a first cryptographic salt 28 stored in the digital storage element 20 to generate a first hash 30. The first hash 30 is compared to a first hash signature 32 stored in the digital storage element 20 to determine if the first hash represents an authentic biometric scan requiring continued verification. Optionally, the processor 16 may also be caused to combine the digital fingerprint string(s) 26 with a second cryptographic salt 34 stored in the digital storage element 20 to generate a second hash 36. This second hash 36 maybe transmitted to one or more servers 38 via the transceiver 18 or authenticated locally. By doing this, the biometric scan can be authenticated locally and feedback can be immediate regarding whether the user did or did not generate an authentic biometric scan. Additional communications, potentially costly both in time and dollars, are not required to validate the biometric scan. But at the same time, the locally stored first hash signature 32 is not simply sent to the one or more servers 38 to spoof the authentication since the first hash 30 and the second hash 36 (which is sent to the one or more servers 38) are generated using two different cryptographic salts, 28 and 34 respectively, and are therefore different.

The smart device 12 can be implemented as a personal computer, a smart phone, network-capable TV set, TV set-top box, a tablet, a laptop computer, a desktop computer, a network-capable handheld device, and combinations thereof, for example. In one embodiment, the smart device 12 comprises smart card, a smart credit card, or a block card as described in U.S. patent application Ser. No. 14/705,911 filed May 6, 2015, the entire content of which is incorporated herein by reference. The smart device 12 can include an input device 40, an output device 42, and computer hardware 44 able to embody and/or execute the logic of the processes described herein. Logic embodied in the form of software instructions and/or firmware may be executed on any appropriate hardware. For example, logic embodied in the form of software instructions or firmware may be executed on a dedicated system or systems, or on a personal computer system, or on a distributed processing computer system, and/or the like. In some embodiments, logic may be implemented in a stand-alone environment operating on a single computer system and/or logic may be implemented in a networked environment, such as a distributed system using multiple computers and/or processors. The computer hardware 44 includes processor(s) 16 and a non-transitory computer readable medium 46. The term "processor" as used herein may include a single processor or multiple processors working independently and/or together to execute the logic described herein. Exemplary non-transitory computer readable medium may include random access memory, read only memory, flash memory, and combinations thereof. The term non-transitory computer readable medium, as used herein, may be implemented as a single physical device or multiple physical devices of a distributed system that may or may not be logically related.

The input device 40 is capable of receiving information input from a user, and transmitting such information to the computer hardware 44. The input device 40 can be implemented as a keyboard, a touchscreen, a mouse, a trackball, a microphone, a fingerprint reader, an infrared port, a slide-out keyboard, a flip-out keyboard, a cell phone, a PDA, a video game controller, a remote control, a fax machine, and combinations thereof, for example.

The output device 42 outputs information in a form perceivable by a user. For example, the output device 42 can be a computer monitor, a screen, a touchscreen, a speaker, a website, a TV set, a smart phone, a PDA, a cell phone, a fax machine, a printer, a laptop computer, and combinations thereof. It is to be understood that the input device 40 and the output device 42 may be implemented as a single device, such as for example a touchscreen of a smartphone or a tablet.

The transceiver 18 of the smart device 12 can be wired or wireless and may comprise a multi-band cellular transceiver to connect to the server 38 over 2G/3G/4G cellular networks worldwide. Other embodiments may also utilize Near Field Communication (NFC), Low Energy Bluetooth, or another method to communicate information. The exact technical specifications of the transceiver 18 are subject to change within the final embodiment of the present invention.

Biometric Sensor

The following descriptions refer to a biometric fingerprint scan for ease of discussion. However, it is understood that the biometric scan can be of a face, hand geometry, handwriting, iris, retina, veins, heart rhythm, voice, and the like, and the presently disclosed inventive concepts are not limited to fingerprints or a fingerprint scanner/reader. For example, the biometric sensor 14, sometimes referred to herein as a biometric scanner/reader 14, can comprise a fingerprint scanner, a retina scanner, a heart rate monitor, or other sensor to provide a user verification mechanism and ensure that only authorized users are able to actually carry out transactions.

The biometric sensor 14, for example a fingerprint reader/sensor, can be an integral part of the smart device 12 or can be separate but connected to the smart device 12 in a wired or wireless manner. The design and operation of biometric sensor such as fingerprint sensors (scanners) are understood by those skilled in the art.

Nonlimiting examples of fingerprint sensors include capacitive sensors, optical sensors, thermal sensors, pressure sensors, radio frequency (RF) sensors, ultrasonic sensors, and the like.

In one embodiment, a swipe fingerprint reader/sensor 14 (sometimes referred to as a fingerprint scanner) is utilized whereby the user drags the upper part of the finger across the sensor. The fingerprint scanner 14 operates when the user swipes their finger over it. The fingerprint scanner 14 takes a scan of the user's fingerprint. A complete image is pieced together by accumulating the partial images as the finger moves across the scan area, and details from this scan may be utilized in the method of the present disclosure.

In another embodiment, a static fingerprint reader/sensor 14 is utilized wherein the user places the finger motionless on a surface. Such static readers include a sensor array as large as the area of the image to be captured.

Identification of the Central Feature

Figure 2:
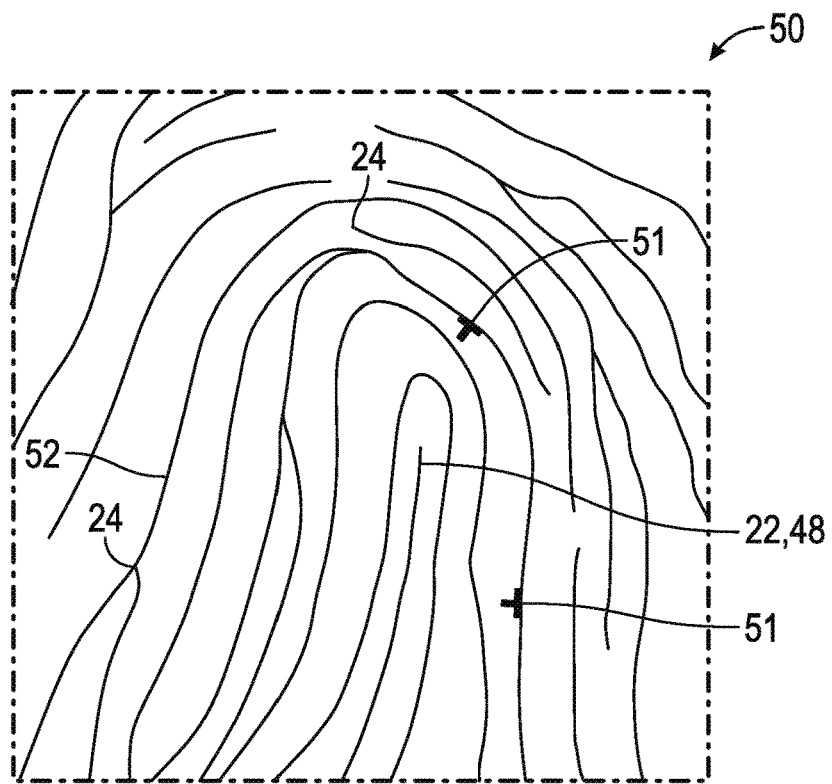
FIG. 2 is an illustration of a fingerprint having a single spike ridge central feature.
Figure 3:
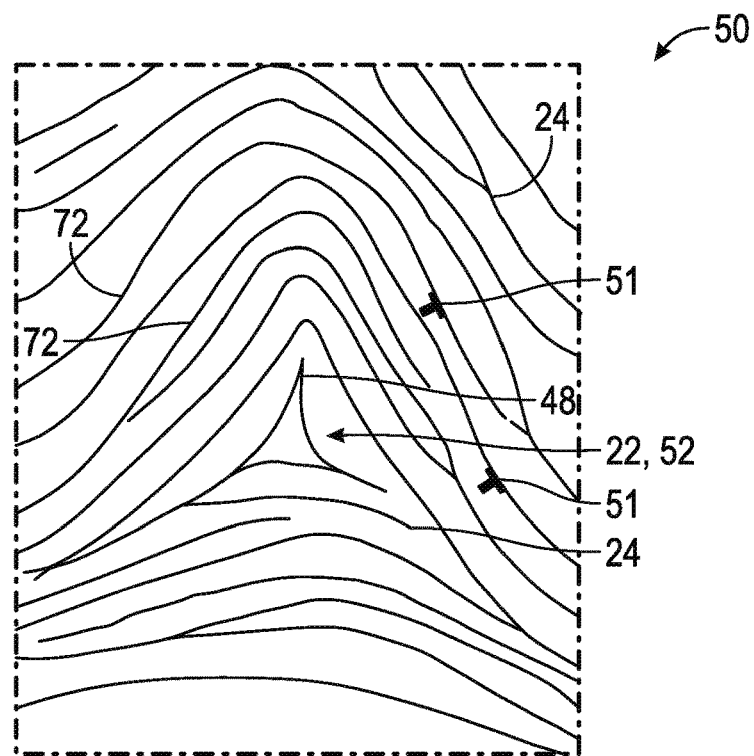
FIG. 3 is an illustration of a fingerprint having a tent arch pattern central feature.

There are a number of means to identify the central feature 22. In one embodiment, machine vision techniques are used to identify the central feature 22. For example, a machine vision algorithm begins by searching for a common feature that will be described as a central ridge 48. It can be generally identified by having the largest number of other ridge swirls that surround it as can be seen in FIG. 2 and FIG. 3.

In one embodiment, the central feature 22 is a central ridge 48 of a fingerprint scan 50, and is identified by looking for normals 51 to the ridge swirls. The normals 51 will converge on the area that contains the central ridge 48. The central ridge 48 is then identified as either a single spike as in FIG. 2 (a ridge that ends in a straight line) or a single ridge swirl with no other ridge inside of its swirl (either an island ridge or a core ridge that makes a u-turn bend). For an arch 52 pattern, or tent arch pattern as in FIG. 3, the central ridge 48 can be defined as the central fold or central bifurcation of the arch 52 pattern, which again can be found by examining the normals 51. However, a small number of fingerprints have a much flatter arch pattern thus making finding an actual central ridge difficult. In this case, the common feature may be a center of the fingerprint scan 50 and the identifiable minutiae 24 that lie the closest to the center of the fingerprint scan 50, selected based on the convergence of normals 51.

Figure 4:
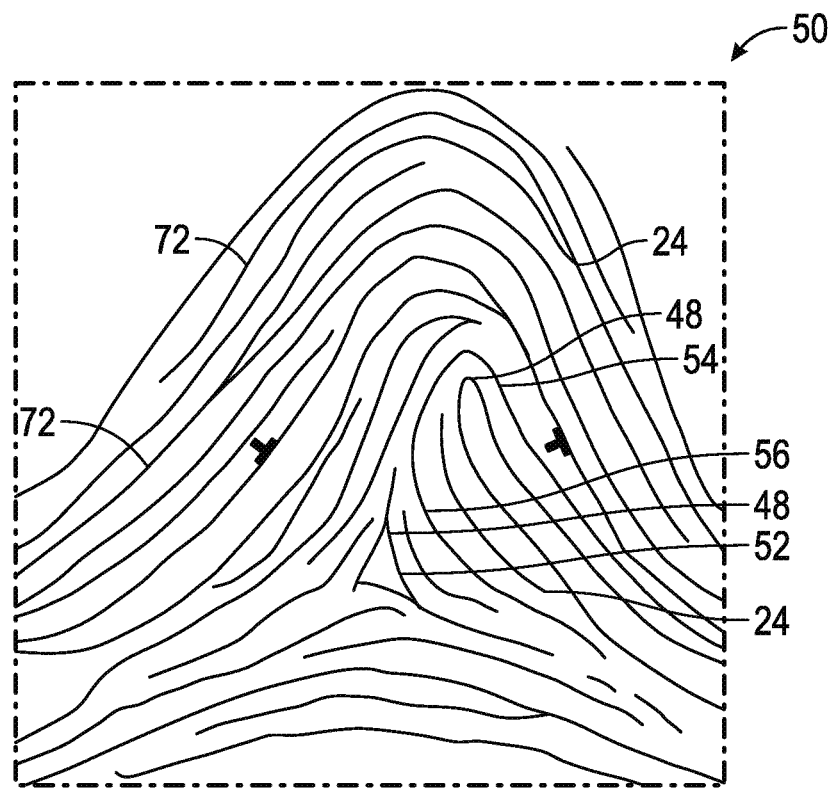
FIG. 4 is an illustration of a fingerprint having more than one possible central feature.

Some fingerprints have two level 1 features and thus could have two central ridges 48. In this case, a well-defined system can be used to select the central ridge 48. Both a hierarchical and a center of mass method have shown good results in our studies. For the hierarchical method, the various level 1 feature patterns are prioritized and the feature with the highest priority is selected as the central ridge 48. For instance, in FIG. 4, the fingerprint has both a tent arch 52 and a swirl ridge or right loop 54. If the predetermined hierarchy is whorl, left loop, right loop, double loop, tented arch, and arch, then for the fingerprint shown in FIG. 4, the right loop 54 would take priority over the arch 52 and as such, the top of the ridge swirl in the middle of the right loop 54 would be selected as the central ridge 48. For the center of mass method, a point that represents the "center of mass" of the minutiae would be found. In this embodiment, the minutiae can all have the same mass, as far as the center of mass algorithm goes, but their distribution will determine where the ultimate center is defined. Whichever level 1 feature is then closer to the center of mass 56 is used to locate the central ridge 48. In the fingerprint in FIG. 4, the result of the center of mass calculation is shown as numeral 56. The center of mass 56 is closer to the tent or delta of the arch 52 and therefore the top of the arch delta would be used as the central ridge 48.

In another embodiment, the central feature 22 comprises a pattern 58 formed by connecting a number of minutiae 24, for example three to six minutia 24 which can be selected from minutiae commonly found in registration scans. While any plurality of minutiae 24 may be used, in one embodiment, the algorithm attempts to identify four minutiae 24 sufficiently distributed across the fingerprint scan 50 such that linear connection of the minutiae 24 results in a readable and reproducible pattern 58 which can be used as the central feature 22.

As described in more detail below, a fingerprint scan 50 can be characterized by a descriptive language that captures the unique qualities of the fingerprint, while doing so in a manner that has a much smaller data footprint and that results in the same descriptive digital fingerprint string 26 for each fingerprint scan 50 of the same finger without the need to compare to previous fingerprint scans 50. By creating a repeatable descriptive digital fingerprint string 26, the smart device 12 can utilize an industry standard cryptographic hash algorithm and need not store or transmit the fingerprint scan 50. This provides much better protection of such sensitive information than would be realized by storing or transmitting the fingerprint scan 50. Thus, the unique digital fingerprint string(s) 26 can identify a given fingerprint; it can be hashed; and it can be hashed in combination with a first cryptographic salt 28 such that the resulting first hash 30 can be used to make comparisons. The fingerprint scan 50, fingerprint data, and digital fingerprint string(s) 26 need never be stored or transmitted.

Generating a Minutia-Based Digital Fingerprint String

The digital fingerprint string(s) 26 can be generated using, for example, a central feature 22 comprising a central ridge 48 and minutiae 24 including ridges that terminate, ridges that split, and ridges that fold sharply. By locating these minutiae 24 and describing them and their locations relative to the central feature 22, a unique descriptive fingerprint string 26 can be created. The locations can be described in relative terms, such as which ridge loop they occur in or how many ridge loops away they are from the central swirl, or as a percentage across the first ten swirls, or other such relative terms. By describing the minutiae relatively, one can account for variances in hardware fingerprint scanners. Furthermore, as each subsequent "swirl ring" is counted, one can select a minimum number of swirls to have fully scanned. If this minimum number is not found, the fingerprint scan can be immediately rejected as being insufficient and there is no need to send the scan to the server for verification.

In one embodiment, once the central feature 22 is found, all minutiae are described relative to it. For example, and using the fingerprint scan 50 shown in FIG. 5, the algorithm looks at ridge ends and ridge bifurcations. To determine the position of a minutia in this example, a straight line is drawn from the origin of the central ridge to the origin of the minutia and the ridges crossed are counted. In addition to the ridge count from the central ridge, a symbol may be used for the minutiae type, an indicator of direction from the central ridge is used, and an indicator of orientation of the minutiae may be used.

Figure 5:
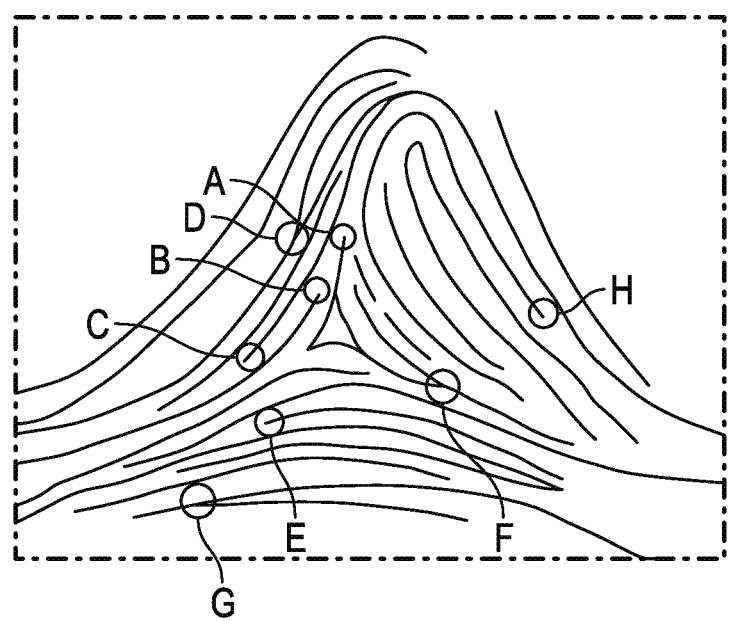
FIG. 5 is an illustration of a fingerprint identifying minutiae used to generate an example digital fingerprint screen.

In one embodiment, for the eight example minutiae identified in FIG. 5, labeled A through H, the codes comprise:

Minutia A: End ridge, 1 ridge away, North from central, South orientation.

Minutia B: End ridge, 1 ridge away, Northwest from central, Southwest orientation.

Minutia C: End ridge, 2 ridges away, Southwest from central, Northeast orientation.

Minutia D: Bifurcation, 4 ridges away, Northwest from central, Northeast orientation.

Minutia E: End ridge, 3 ridges away, Southwest from central, East orientation.

Minutia F: Bifurcation, 2 ridges away, Southeast from central, Northwest orientation.

Minutia G: Bifurcation, 7 ridges away, Southwest from central, East orientation.

Minutia H: End ridge, 7 ridges away, East from central, Northwest orientation.

If these minutiae are then turned into a code, where 1=End ridge, 2=Bifurcation, and 1=North, 2=Northeast, 3=East, 4=Southeast, 5—South, 5=Southwest, 7=West, and 8=Northwest, then the resulting codes for the eight minutiae A-H respectively, would be: 1115, 1186, 1262, 2482, 1363, 2248, 2763, 1738. This represents a minutia-based digital fingerprint string(s) that can be hashed.

Since one cannot guarantee the codes will be found in the same order on every scan, the resulting codes can be sorted such that regardless of the order they are found, they would end up the same in the concatenated string. Thus, the resulting concatenated string would be 1115-1186-1262-1363-1738-2248-2482-2763. The full string can be much longer since far more than eight minutiae can be located. In order to keep the codes consistent, a threshold can be used to determine how far out to search. In the present example, a maximum of 9 ridges out from the central ridge could be encoded as any farther would then create a variable length code. Furthermore, since sometimes the algorithm can "see down a trough" and therefore only encounter a single ridge out to the edge of the print, after all of the minutiae are located, all of those that are 9 ridges away may be located and the one closest to the central ridge would then become the maximum radius away from the central ridge that will be searched. Limiting the search to this much central area decreases the chance that a minutia was not scanned and therefore not included in the resulting digital fingerprint string. In these embodiments in which this methodology relies on an exact match, the minutiae registered must be found on subsequent scans in order to be authorized.

A similar process can be utilized for other biometric readers. A retinal scan can use the optic nerve, for example, as a central position in the same manner as the central ridge was used for the fingerprint. Retinal scan minutiae can then be described and located with respect to the position and diameter of the optic nerve. Iris scanning can locate iris minutiae with respect to the center (pupil) and diameter of the iris. One skilled in the art can readily understand how other biometric readers can be utilized in the methods and systems described herein.

During the registration process, multiple unique strings can be found. This occurs largely due to slight shifts in orientation. In the above example, a total of eight compass zones were used for both direction from center and for orientation. A slight shift in the orientation of the fingerprint can cause those directions or orientations that are close to a directional boundary to shift from one zone to another, thus resulting in a different code. This can be partially overcome by making the "north" direction relative to the orientation of the central ridge instead of relative to the top of the scan. In the example above, they are one and the same. If the right loop were used instead, the "north" would be roughly "southeast" compared to the top of the page. If this still occurs because some of the directions or orientations are very close to a border, then during the registration process, multiple codes can be stored with the requirement that any stored code must appear at least twice.

Thus, due to the variability of scans and the sometimes arbitrary definition of boundaries and regions, a single fingerprint might generate a few unique data strings. For instance, if one of the uniquely identified details of the fingerprint is on the edge of two zones, on some scans it might be mapped into zone one and on other scans it might be mapped into zone two. One method for solving this issue is to simply store the hash signature 32 of both strings during the registration process. Then, when the fingerprint is scanned for authentication, the resulting first hash 30, sometimes referred to herein as a hash string 30, is compared to each of the stored hash signatures 32 from the registration process and if either matches, then the fingerprint is authorized.

Generating a Pattern-Based Digital Fingerprint String

Many touch based sensors, as opposed to swipe sensors, do not capture a large enough portion of the fingerprint for the above-described minutiae based algorithm to capture enough entropy, or random information, to insure the necessary uniqueness of the fingerprint matching. While the touch sensors do not capture as large an area as the swipe sensors, they do have the advantage of capturing that data all at once. This generally means that there is less distortion to the fingerprint scan 50 than occurs with swipe sensors. Thus, if the orientation can be accurately determined, the relative locations and orientation of ridges should remain very consistent.

To take advantage of this, the central feature 22 comprises a pattern 58 formed by connecting a number of selected minutiae. The minutiae can be selected from all of the minutiae found common among the majority of registration scans. While any plurality of minutiae 24 may be used, in one embodiment, the algorithm attempts to identify four minutiae 24 with a good distribution across the fingerprint scan 50. There are a number of reasons for the selection of four minutiae 24. First, by using four minutiae 24 for the central feature 22, the four selected minutiae connect with six lines which results in sufficient ridge crossings and therefore sufficient entropy for the resulting hash signature 32. Second, the four minutiae 24 can form one of only two general patterns 58, making it easier to recognize and categorize the pattern 58 formed. Third, this results in an easily stored hint to ensure that the correct pattern has been chosen for subsequent matching. And fourth, the more minutiae 24 in the pattern 58, the higher the likelihood that one or more of the minutiae 24 will not be on the subsequent scans, either because they are beyond the edge of the scanner area or because they are missed due to a false negative in the minutiae detection algorithm.

The resulting algorithm, described in more detail hereinafter, can handle false positives as well as extra real minutiae 24 in and around the pattern 58. By using the stored hints, the algorithm is able to find the correct selection of minutiae 24 that were used to form the original pattern 58. The algorithm cannot handle false negatives or missing real minutiae. If that should happen, the pattern 58 will not be found or the wrong pattern will be found, and either way the resulting hash string 30 will not match the first hash signature 32. Thus, in one embodiment, four minutiae are selected. However, it is readily apparent that this algorithm will work, although potentially less optimally, with a larger or smaller number of minutiae 24.

In one embodiment, there are a sufficient number of minutiae 24 selected to form the central feature 22 to create the desired entropy in the resulting hash signature 32, but there are not so many minutiae 24 selected that subsequent fingerprint scans 50 are always missing one or more of the necessary minutiae 24.

Figure 6:
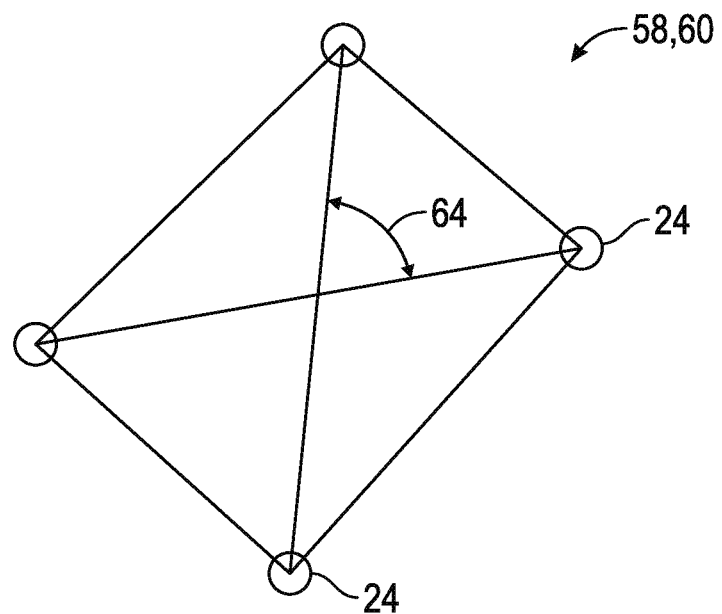
FIG. 6 is an illustration of a kite pattern central feature used in one embodiment of the presently disclosed inventive concepts.
Figure 7:
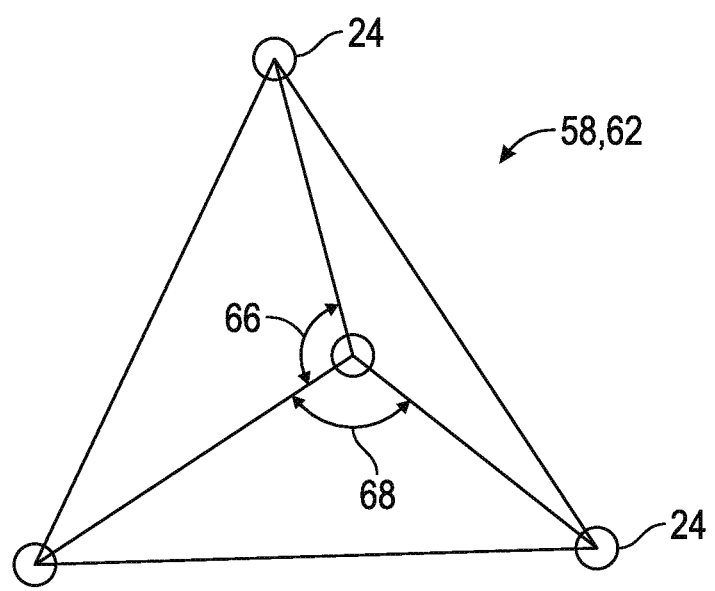
FIG. 7 is an illustration of a pyramid pattern central feature used in one embodiment of the presently disclosed inventive concepts.

After the minutiae 24 are selected, the algorithm connects the center points of these minutiae with lines, forming a definitive and repeatable pattern 58. When four distributed minutiae 24 are used, one resulting pattern 58 is a kite pattern 60 as shown in FIG. 6, with four connecting lines of adjacent vertexes forming the perimeter of the kite pattern 60 and two connecting lines of the opposite vertexes forming a cross in the middle of the kite pattern 60. A pyramid pattern 62 is the other potential pattern 58 or shape formed by connection of the center points of four minutiae with lines. In this case a single minutia 24 is located in the center of a perimeter formed by the remaining three minutiae 24. Thus, three connecting lines of adjacent vertexes form the perimeter of the pyramid pattern 62 and three connecting lines radiate out from the central vertex to the perimeter vertexes as shown in FIG. 7. What differentiates these two patterns is whether any of the connecting lines cross. In the kite pattern, they do. In the pyramid pattern, they do not.

To help identify which minutiae 24 are selected when confirming the fingerprint later on, a hint can be stored regarding the pattern. In one embodiment, a first hint is a flag to indicate whether a kite pattern 60 or a pyramid pattern 62 is formed. If the kite pattern 60 is formed, the angle of intersection 64 of the two lines that cross can be stored as a second hint. If the pyramid pattern 62 is formed, then two angles, 66 and 68 respectively, between the radiating lines can be stored as hints. Thus, in subsequent fingerprint scans 50, the algorithm can quickly determine which minutiae 24 were selected for the pattern 58 used to generate the hash signature 32. But by storing just the angles 66 and 68, there is no information available to recreate a synthetic fingerprint. While these angles are used as hints in one embodiment, it is understood that other hints can be used.

In one embodiment, hints are selected to provide sufficient information such that only the correct selection of minutiae will result, but not so much information that it can in any way help recreate the fingerprint information.

In instances where there are two groups of minutiae 24 that form a similar pattern 58, and both of the groups are found on subsequent fingerprint scans 50, one of the patterns 58 will produce the matching hash string 30 and the other will not. The reason the hints are used is for the case where there are a good number more minutiae than are used in the pattern. For instance, in one embodiment, four minutiae 24 are used. If seven minutiae 24 are present, that means the correct pattern is just one of 840 possible permutations. It would be computationally intensive to determine the correct pattern 58 by producing the hash string 30 for each possible pattern 58 and finding the one that matches. By using hints, however, one can connect all seven minutiae 24 and quickly narrow down to the four that produce the correct intersecting angles. Then, as stated above, if there are two or three patterns 58 that produce angles that are within the accepted tolerance for the stored angle hints, in some embodiments, only those two or three patterns 58 need to be checked.

In one embodiment, once the matching pattern 58 of minutiae 24 has been identified, or at least candidates for the matching pattern 58, the next step is to find the center 70 of the pattern 58. This can be accomplished in a number of ways such as, for example, using the geometric center of the four minutiae. Once the center 70 of the pattern 58 is located, one can use the previously described method or algorithm to generate the unique digital fingerprint string. This can be done using the octant, number of ridges from center, minutiae type, and minutiae orientation stored and sorted as described previously. However, this only represents 40-bits of entropy and more may be desired or required. Even if a few more minutiae 24 are used, there may still not be sufficient entropy since most touch sensors capture a much smaller portion of the fingerprint data.

Thus, in one embodiment, ridge information is used to obtain additional bits of entropy. For example, for each of the connecting lines, all of the ridge crossings can be located. For each crossing, both the rising edge and falling edge can be located and calculated as a distance along the connecting line, relative to the overall length of the connecting line.

In one embodiment, ridge information is found for six connecting lines and will be represented as a 5-bit value, meaning each intersection will be found to the closest 1/32nd of the overall length of the line (although other measurements other than the closest 1/32nd can be used). The orientation of the ridge relative to the connecting line will also be found. Since ridges are bidirectional, there are only four possible orientation values rather than the usual eight. This provides an additional 2-bits of information. When combined with the 5-bits of distance information and a single bit indicating whether it is a rising or falling edge of the ridge, 8-bits of information per ridge are found in the intervening space between the minutiae 24.

In our testing, we found an average of 5 edges per connecting line. Thus, in one embodiment, 6 lines×5 edges× 8-bits of information, represents 240-bits of information. While there is likely a lot of correlation across all of the fingerprints, even with 50% correlation, that still adds 120-bits of entropy to the 40-bits of entropy from the minutiae information, which means this approach still significantly crosses the threshold of 128-bits of entropy which is an industry standard.

We found in our testing that additional minutiae, while adding to the total entropy, did not significantly increase the security of the resulting hash signature 32 and only increased the probability that one of the minutiae was missing in subsequent fingerprint scans 50 resulting in a negative scan. Thus, four minutiae were determined to be optimum. If more than four minutiae are found during the registration process, only four of the minutiae may be chosen for the stored hash signature and these four are selected based on their general distribution across the entire scan as well as how repeatedly they are found in a plurality of scans used during the registration process.

To generate the unique digital fingerprint string 26 that is used as input for the hash procedure, a similar approach can be used as for the minutiae-based algorithm. For example, for each edge of a ridge, the distance from the originating vertex can be calculated based on the relative distance along the entire line. To ensure that the same originating vertex is used when verifying the fingerprint scan 50, one embodiment uses the vertex that is found first in the unique digital fingerprint string 26. The measurement is then made in the direction of the vertex that is found later in the unique string as in the minutiae-based algorithm. Then, for each ridge found, the following information is determined and stored: a 1-bit value (a value of 0 or 1 corresponding to rising or falling) to indicate whether this is a rising or falling edge, a 5-bit value (a value from 0 to 31 corresponding to each of the 32 even portions of the line) representing the relative distance along the line where the intersection occurs or more precisely what portion of the line the intersection occurs in, and a 2-bit value (a value from 0 to 3 corresponding to the degree ranges of 0-45, 45-90, 90-135, 135-180, respectively) relative orientation to the line representing which angle the ridge meets at using a right-hand rule (determined using a simple cross-product of the connecting line and the ridge). As with the minutiae-based algorithm, these values are then compiled and sorted to form a digital fingerprint string 26.

As with the minutiae-based algorithm, when verifying the fingerprint, any values that are close to a boundary condition, such as being near the edge of one of the 32 portions of the connecting line or being close to one of the boundary angles (45, 90, 135, 180/0) are noted along with the value for the other side of the boundary condition and how close they are to the boundary condition. Thus, if the unique string does not result in a match, as described above, the fingerprint verifying algorithm can try swapping out the alternate value for the boundary conditions in the event that a slight shift in how the fingerprint is scanned results in one of the minutiae or one of the ridges being in a slightly different position.

Once the resulting unique pattern-based fingerprint string 26 has been generated, it can be hashed and used as previously described using the minutiae-based methods.

Cryptographic Salt and Hash

Prior art methods of fingerprint identification use a remote system to scan the fingerprint and then transmit the result to a server for authentication. If the remote system is not trusted (and it should not be since it is out of the direct control of the system doing the verification) then the check for authentication must occur on the server. One problem with this approach is that quite often a finger does not make sufficient contact with the fingerprint sensor and thus the scan is incomplete or otherwise invalid. But since the server must make the comparison, the user is not aware of the failed scan until after the connection to the server has been made, all of the fingerprint data has been transmitted to the server, and the server is able to make a comparison to stored templates or data from the registration process. At that point, the user is informed the scan was incomplete and they must scan again, starting the whole process over again, wasting valuable time and data transmission.

Prior art deficiencies cannot be adequately solved by merely storing fingerprint registration data on a remote system in order to do a comparison before connecting to the server because then, if the remote system is compromised, the individuals compromising the system can use that stored data to send a synthesized fingerprint to the server and thus forge an authentication when there is none. But the presently disclosed and claimed methods solve this issue by using unique first and second cryptographic salts 28 and 34, respectively. A salt is a chunk of data used in combination with input data in order to produce an output hash that cannot be easily compared in brute force attacks. A brute force attack cryptographically hashes a series of input data, such as entries in a dictionary for trying to find someone's password, and compares the output hash to that which was stored. If the output hash matches what was stored, then the corresponding input data is the secret password. However, if an unknown piece of data is combined with the input password, then the resulting hash will be different than those generated by the brute force method. By keeping the hash values secret, the brute force method will not work to determine the value of the input data.

This property of cryptographic salts can be used to allow the biometric identification system 10 to do a local verification of the biometric data without compromising the security of a remote server 38. When the user is first registering his or her fingerprint and creating the initial stored hashes, there may be two sets of hashes created. The first hash signature 32 may be created using a "local salt" or first cryptographic salt 28 and the second set may be created using a "remote salt" or second cryptographic salt 34. These are two different salt values, one for use in storing and comparing the result on the remote server system 38 and the other for storing and comparing the result on the local system or smart device 12. The first hash signature 32 is produced with the first cryptographic salt 28 and is stored on the local system or smart device 12. A second hash signature 74 is stored on the remote server system 38. When the user attempts to validate using a biometric sensor 14 such as a fingerprint scanner, the resulting digital fingerprint string 26 may first be hashed with the first cryptographic salt 28 ("local salt") and the resulting first hash 30 compared to the first hash signature 32 stored on the local system or smart device 12. If this fails to match, the user may be immediately informed that the fingerprint did not validate and then asked to scan again. This can happen immediately without the need to open a connection to the remote server system 38 and transmit the data. If the first hash 30 does match the first hash signature 32, then the second cryptographic salt 34 ("server salt") can be used and the resulting second hash 36 transmitted to the server system 38 for comparison. Now the remote server system 38 can do the authentication itself without needing to trust the local system or smart device 12 to provide the correct answer. Furthermore, if the local system or smart device 12 is ever compromised, the first hash signature 32 stored in the smart device 12 will not further compromise the remote server system 38 because the server 38 is expecting the second hash 36 which is a very different hash than the locally stored first hash signature 32.

Registration Process

Figure 8:
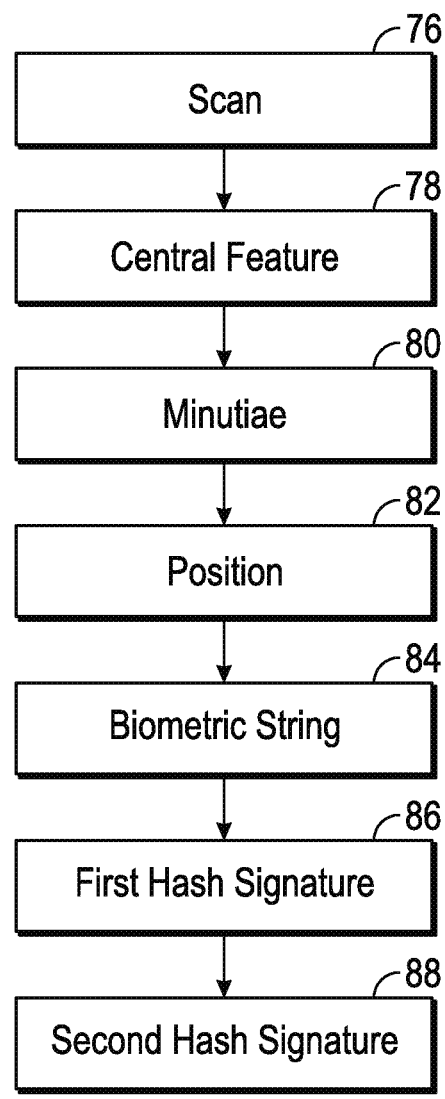
FIG. 8 is a general exemplary flow chart of a biometric scan registration process of the present disclosure.

A general flow chart of the registration process is shown in FIG. 8. In step 76 a user first scans an aspect of the user's physiology. A central feature is identified in step 78 and at least two minutiae of the user's scanned physiology are identified and characterized in step 80. The position of each of the at least two minutiae relative to the central feature is determined in step 82. A digital biometric string(s) is generated in step 84. The biometric string identifies a position of each of the at least two minutiae relative to the central feature. The biometric string may also include information regarding the type of each minutia. The digital biometric string(s) is combined with a first cryptographic salt to generate a first biometric hash signature in step 86. The first biometric hash signature can be stored locally. The digital biometric string(s) is then combined with a second cryptographic salt to generate a second biometric hash signature in step 88. The second biometric hash signature is uploaded to and registered with one or more servers.

Figure 9:
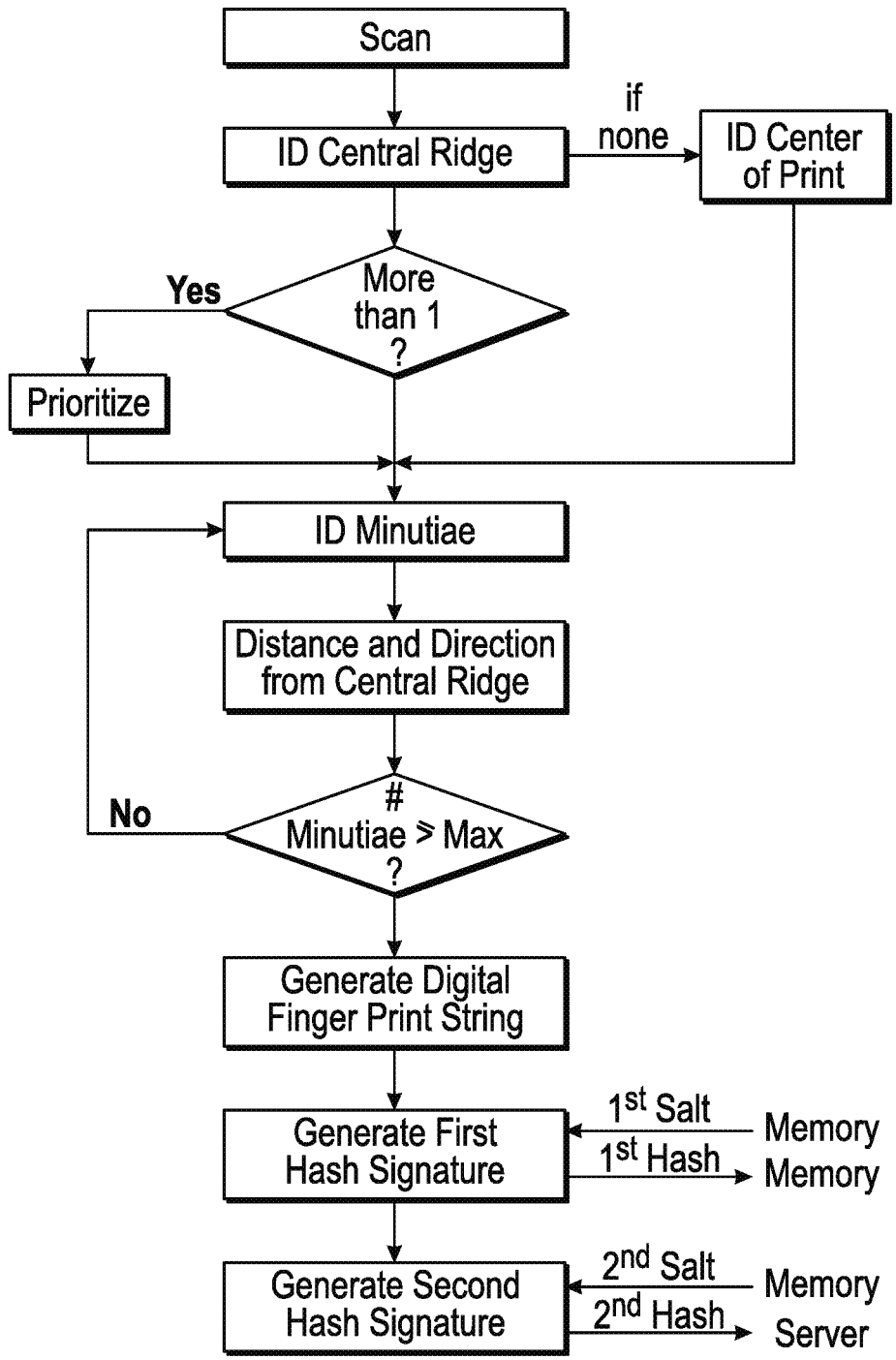
FIG. 9 is an exemplary flow chart for a fingerprint scan registration process embodiment.

In an example registration process illustrated in FIG. 9, an owner scans his or her fingerprint using the smart device 12. In this example, the smart device 12 uses a swipe-type fingerprint scanner capable of identifying a large number of minutiae. The smart device 12 determines the presence of the central feature 22 comprising the central ridge 48. If more than one central feature is present, the features are prioritized. If no central feature or central ridge can be identified, the central feature 22 is defined as the center of the scan using procedures described earlier. The minutiae are identified and characterized in terms of type and distance and direction from the central ridge 48. The step of minutiae identification and characterization continues until no more are found or a predetermined maximum number have been found and characterized. A digital fingerprint string(s) 26 is then generated using the minutiae distance and direction from the central ridge. A hashing operation is performed on the digital fingerprint string(s) 26 using a first cryptographic salt 28 assigned to the owner and stored in the digital storage element 20 of the smart device 12. The resulting first hash signature 32 is then stored in the digital storage element 20 and used to compare future finger print scans. A second cryptographic salt 34 assigned to the owner and stored in the digital storage element 20 of the smart device 12 is used to perform a second hashing operation to provide a second hash signature which is sent to the server system 38 as a template for confirming the authenticity of future fingerprints.

Figure 10:
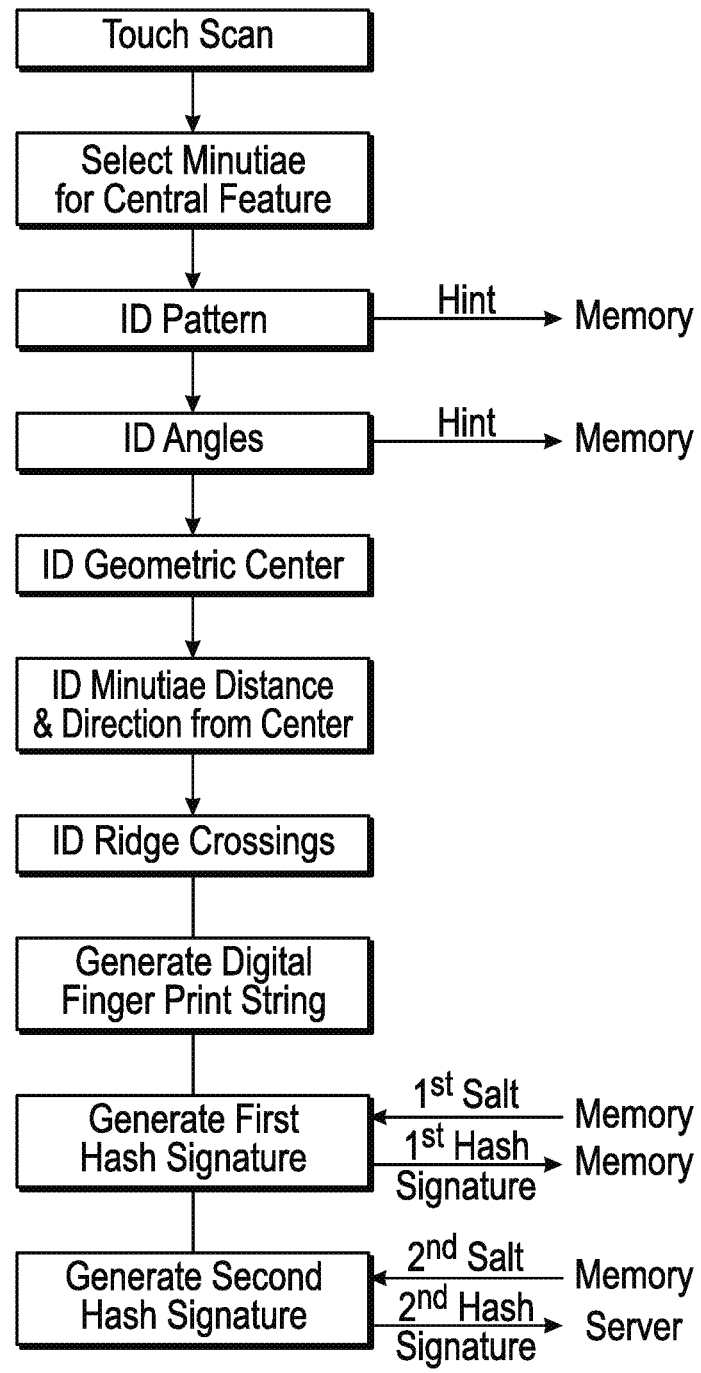
FIG. 10 is another exemplary flow chart for a fingerprint scan registration process embodiment.

In another example registration process illustrated in FIG. 10, an owner scans his or her fingerprint using a stationary scanner on the smart device 12. The central feature 22 is determined by selecting four centrally distributed minutiae 24 and connecting the four minutiae with straight connecting lines to form the pattern 58. This pattern 58 is used as the central feature 22. The pattern shape and specific angles as described above can be stored in the memory or digital storage element 20 of the smart device 12 as future "hints." Additional minutiae are identified and characterized in terms of type and distance and direction from the geometric center of the pattern 58. Additional information is obtained by identifying and characterizing the ridge crossings along each of the pattern connecting lines. A digital fingerprint string(s) 26 is then generated using the minutiae and ridge crossing information. A hashing operation is performed on the digital fingerprint string(s) 26 using a first cryptographic salt 28 assigned to the owner and stored in the digital storage element 20 of the smart device 12. The resulting first hash signature 32 is then stored in the digital storage element 20 and used to compare with future finger print scans. A second cryptographic salt 34 assigned to the owner and stored in the digital storage element 20 of the smart device 12 is used to perform a second hashing operation to provide a second hash signature which is sent to the server system 38 as a template for confirming the authenticity of future fingerprints.

This method offers a number of advantages beyond the obvious advantage of not storing fingerprint data or fingerprint template data that can be used to synthesize a phony fingerprint. Since most current methods are image based matches, the amount of data that must be transmitted and stored is much higher than with the resulting hash string from this proposed method. Second, for a remote scanning system that must then authenticate to the server system 38, it allows for local checking of the fingerprint without the need to trust that the server system 38 has not been hacked.

Note that this approach can be expanded to handle multiple server authentications by using yet another salt and producing yet another hash from the same input data. Furthermore, in the above description, the two hashes are produced sequentially, but there is no reason they cannot be generated simultaneously and then just the comparison done sequentially or even the two done in parallel, with the local comparison obviously finishing first and thus being able to either abort the transmission in progress or initiate a new one without having to wait until the negative response comes back from the server system 38.

Use of the Biometric Identification System

Figure 11:
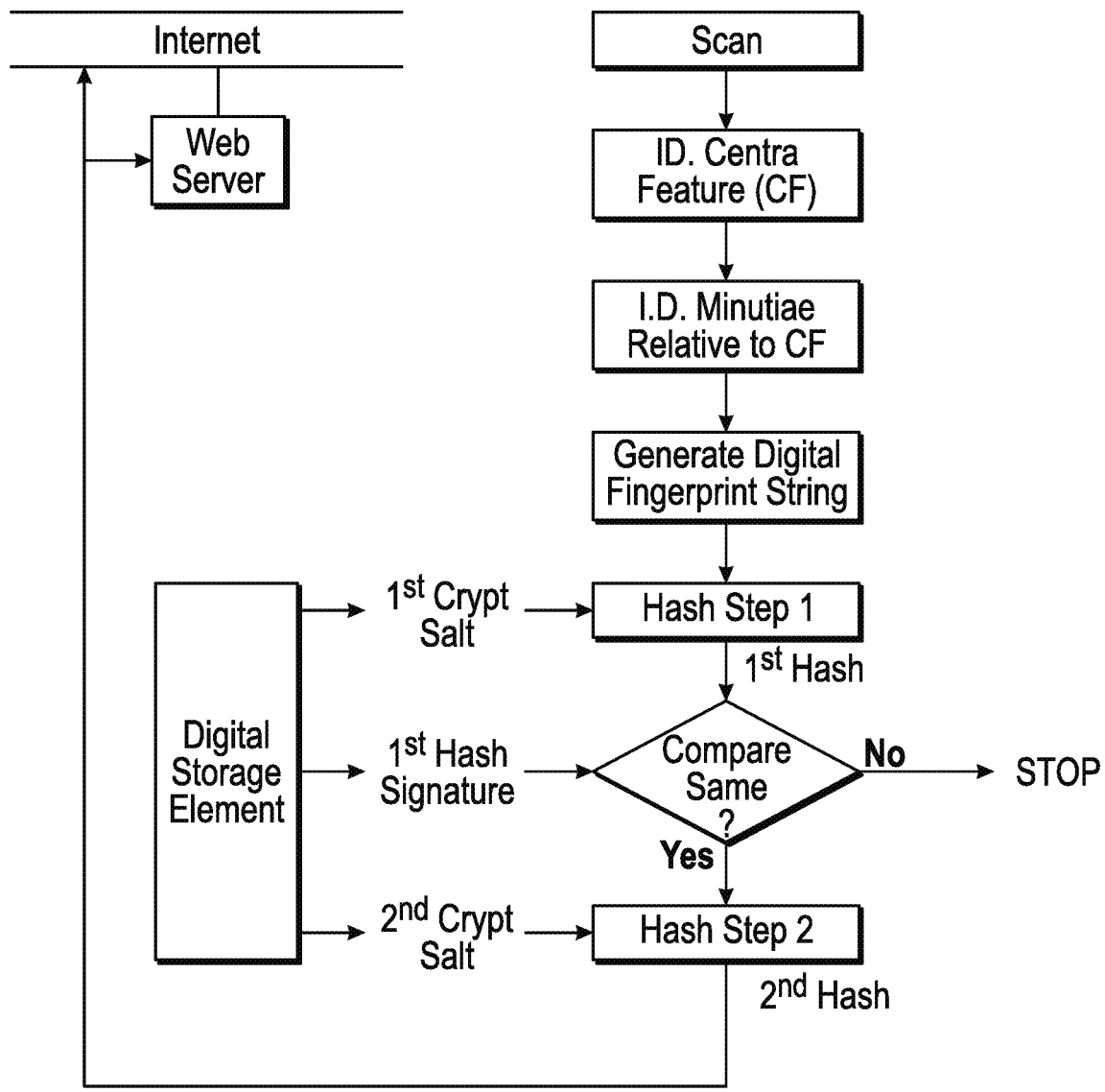
FIG. 11 is an exemplary flow chart of the biometric identification system of the present disclosure.

A flow chart illustrating an exemplary use of the fingerprint identification system 10 is shown in FIG. 11. A user scans his or her fingerprint using the smart device 12. The smart device 12 determines a digital fingerprint string(s) as described above and performs a hashing operation using the first cryptographic salt assigned to the owner and stored in the digital storage element 20 of the smart device 12. The resulting first hash 30 is then compared to the first hash signature 32 stored in the digital storage element 20. If the first hash 30 does not match the first hash signature 32 to a specified degree, the process is ended. If the first hash 30 does conform to the first hash signature 32, then the fingerprint scan is identified as authentic and the second cryptographic salt 34 assigned to the owner and stored in the digital storage element 20 of the smart device 12 is used to perform a second hashing operation to provide a second hash 36 which, in one embodiment, is sent to a web server (or other type of server, such as an internet server) for verification.

The presently disclosed fingerprint identification system can be used in conjunction with credit card purchases, bank account viewing, and other systems typically requiring passwords. Passwords can be changed once hacked, but fingerprints cannot be easily changed. Using the present system, if the fingerprint hash is stolen, one need only report the theft and obtain a new cryptographic salt.

In the following additional examples, specific uses of the fingerprint identification system are described. However, the presently disclosed inventive concept(s) are not limited in its application to the specific exemplary procedures. Rather, the Examples are simply provided as one of various embodiments and are meant to be exemplary, not exhaustive.

EXAMPLE 1

A credit card company uses fingerprint scanners to further protect its clients and itself from fraudulent transactions. The fingerprint scanner can be included in the credit card reader used by the merchant, or the fingerprint scanner can be incorporated in a smart credit card used by the consumer. In this example, the fingerprint scanner is incorporated into a smart credit card. To set up the consumer's credit account, the consumer is issued a smart credit card having a processor, and a transceiver, fingerprint scanner and a non-transitory digital storage element coupled to the processor. To protect the consumer from fingerprint theft, a first cryptographic salt and a second cryptographic salt are assigned to the consumer and the values are stored in the non-transitory digital storage element of the smart credit card prior to mailing the card to the consumer.

Upon receipt, the consumer activates the card by calling the credit card company from the consumer's home phone. The consumer is directed to scan his or her fingerprint several times using the scanner incorporated in the smart credit card. In this manner, the fingerprint scan is totally within control of the consumer. As described above, the central ridge or center portion of the resulting fingerprint scan is identified along with type and location data of minutiae found, thereby generating a digital fingerprint string(s). The digital fingerprint strings are combined with the first cryptographic salt stored in the digital storage element to generate a first hash signature which is stored in the digital storage element of the smart credit card. Similarly, the fingerprint strings are combined with the second cryptographic salt stored in the digital storage element to generate a second hash signature which is uploaded to the server system for the credit card company. The smart credit card is now ready to use.

EXAMPLE 2

A cryptocurrency virtual wallet system as described in U.S. patent application Ser. No. 14/705,911 filed May 6, 2015, uses a secure device 90 (an embodiment of which is referred to as a block card), a web portal, a server, and a data vault. The secure device 90 can be in a card-like configuration. The block card 90 may be a physical card structure which can be carried by the user, either in their wallet or purse. The precise dimensions of the block card 90 can vary; however, the present example makes use of the standardized ISO/IEC 7810 card size. The block card 90 shown in FIG. 12 and FIG. 13 comprises components which enable its various different functionalities including a display screen 92, a finger print scanner 94, a key pad 96 including control buttons, a scanner such as a camera 98, a wireless transceiver 18 for secure communication with one or more servers 38 over wireless networks, a processor 16 and a digital storage element 20 that may be incorporated into the processor 16 and combinations thereof, and a magnetic strip 100. The camera 98 allows the block card 90 to accept visual information as input. Although the present example describes the use of the block card 90 with a particular type of cryptocurrency known as Bitcoin, it should be understood that the block card 90 can be used with other types of currency. When the block card 90 is designed to be used with Bitcoin, the camera 98 may be necessary as most Bitcoin transactions are carried out at least in part by quick response (QR) codes, although other patterns such as a bar code or textual information can be captured and interpreted by the block card 90. The camera 98 may be located on the back of the block card 90 as can be observed in FIG. 13. The exact technical specifications of the camera 98 and its positioning on the block card 90 are subject to change.

The fingerprint scanner 94 is included with the block card 90 to ensure that only authorized users of the block card 90 are able to actually carry out transactions. The fingerprint scanner 94 is located on the front of the block card 90, as can be observed in FIG. 12, and operates when the user touches their finger on it. The fingerprint scanner 94 takes a scan of the user's fingerprint, and minutiae and other data from this scan may be utilized in the method of the present disclosure. Although a fingerprint scanner 94 is described herein by way of example, other types of biometric readers can be used, e.g. retina scanner, heart rate monitor, etc., to provide a user verification mechanism and ensure that only authorized users of the block card 90 are able to actually carry out transactions.

The wireless transceiver 18 may be embedded within the block card 90, and is included to allow for relatively secure wireless communication of data between the block card 90 and the server 38. In one embodiment, the wireless transceiver 18 is utilized in the method of the present disclosure for sending a second hash 36 along with a partially signed bitcoin transaction to the server 38 during certain transactions, along with other communications with the server system 38 described herein. The block card 90 may use a multi-band cellular transceiver to connect to the server over 2G/3G/4G cellular networks worldwide but other embodiments may also utilize Near Field Communication (NFC), Low Energy Bluetooth, or another method to communicate transaction information. The exact technical specifications of the wireless transceiver 18 are subject to change within the final embodiment of the present invention.

Figure 12:
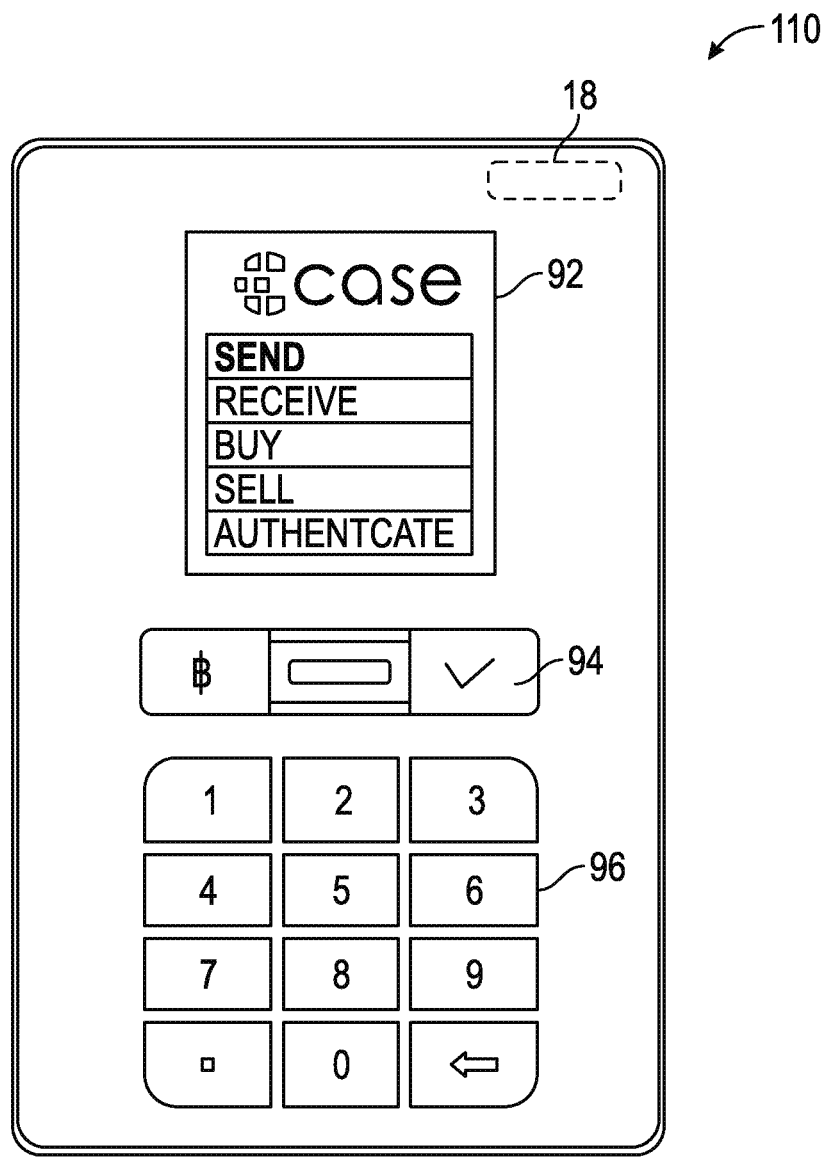
FIG. 12 is a front view of a smart device used in Example 2 of the present disclosure.
Figure 13:
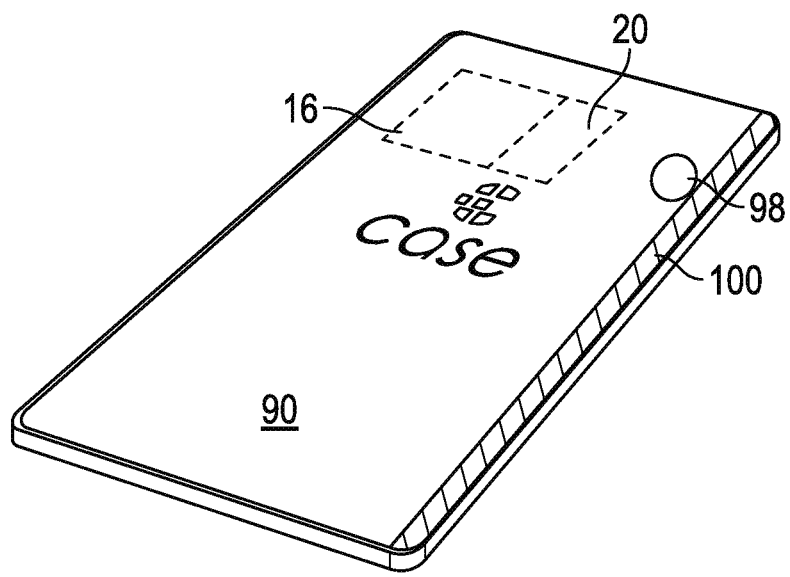
FIG. 13 is a rear view of the smart device shown in FIG. 12.

The display screen 92 may be located on the front of the block card 90 as can be observed in FIG. 12. The primary purpose of the display screen 92 is to allow the block card 90 to display amounts of bitcoins which are being sent or received by the user, along with a wallet balance, currency exchange rates, and other useful information. Additionally, the display screen 92 is responsible for displaying QR codes to be scanned by another device when bitcoins are being sent to the user by another party, such as for a merchant.

The magnetic strip 100 may be located on the back of the block card 90 as can be observed in FIG. 12. The purpose of the magnetic strip 100 is to allow the block card 90 to function as a debit or a credit card if so desired by the user. As such, the magnetic strip comprises a standard magnetic strip for transfer of information to a point of sale terminal; in one embodiment, the magnetic strip would be almost identical to the magnetic strips found on modern credit and debit cards. Other embodiments may contain a dynamically programmable magnetic strip which can store and use multiple credit or debit cards. Other embodiments might omit the magnetic strip in its entirety using just the QR codes to transfer transaction information.

The digital storage element 20 may be non-transitory, and embedded into the block card 90, and is responsible for providing digital storage space for an encryption key which represent the user's bitcoins, as well as storing other user information such as the User Data Encryption Key (UDEK), the first and second salts, and the first hash signature. Only one of three encryption keys may be stored on the digital storage element, thus preventing compromise of the user's bitcoins if the block card 90 is ever lost or stolen.

Directly related to the digital storage element 20 is the processor 16. The processor 16 is responsible for providing the computing power necessary to perform the several functions of the block card 90 such as signing transactions with the encryption key, breaking down the fingerprint scan into minutiae identifying a specific pattern when linearly connected, identifying an angle of intersection of the connecting lines or angles between radiating lines, calculating the pattern center of mass, identifying the position of the minutiae with respect to the center of mass, identifying and characterizing ridges intersecting the connecting lines, determining a digital fingerprint string based on the aforementioned information, hashing the digital fingerprint string and comparing the hash to a hash signature to determine if the fingerprint is authentic, hashing the digital fingerprint scan with a second cryptographic salt to produce a server hash which can be sent to the server, generating QR codes to receive certain amounts of bitcoin from other parties, and interpreting scanned QR codes to send bitcoins to other parties.

The web portal (which may also be an Internet portal) may provide certain pertinent information to the user such as the current account balance, transaction history, and account information. Furthermore, the web portal may enable the user to control certain aspects of their account such as the contact information or any bank account information associated with the account. In order to login to the web portal, the user may be required to utilize the block card 90 to receive a one-time password and then enter this one time password into the web portal in addition to other authentication factors such as a password or biometric data. This provides additional authentication that the user attempting to log in to the web portal is the true owner of the block card 90. The embedded wireless transceiver 18 and the embedded encryption key allow for multiple methods of secure multifactor authentication which are not possible with traditional one time password generators.

The server system 38 maintains a connection to the Internet. The primary purpose of the server system 38 is to store another one out of three of the encryption keys which represent the user's bitcoins. Additionally, the server system 38 stores server hash fingerprint signature data in order to compare to information sent to the server from the block card number. The fingerprint scanner 94 on the block card 90 and the fingerprint identification system 10 may be used to insure that the true owner of the bitcoins is attempting to make a transaction with the block card 90 without storing actual fingerprint data for the user. The server system 38 is also responsible for facilitating transactions, and therefore performs the typical functions of a bitcoin wallet including keeping track of unspent balances, structuring transactions, signing transactions, and broadcasting fully signed transactions to the Bitcoin network. The block card 90 acts as a co-signing device in conjunction with the bitcoin wallet on the server system 38. In order to create a relationship between the block card 90 and server system 38 that is as secure as possible, the present disclosure creates an environment where the block card 90 and server system 38 do not trust each other during a transaction to ensure that there is no single point of failure. When the block card 90 requests to send a specific amount of bitcoins to a specific address, the server system 38 validates the request by comparing the fingerprint server hash sent by the block card 90 against the fingerprint server hash signature. The server system 38 may only create an unsigned transaction and sends transactions to the block card 90 if the fingerprint hash matches. The block card 90 validates that the transaction the block card 90 is being asked to sign is the transaction the block card 90 intended to perform by verifying the receiver address and amount, along with the change address, which should be controlled by the block card owner. The block card 90 then signs the transaction with its embedded encryption key and sends the partially signed transaction to the server system 38. The server system 38 signs the transaction with its encryption key if the fingerprint server hash matches the server system 38 stored hash signature, to create a co-signed transaction that may then be broadcasted to the Bitcoin network by the server system 38, so that bitcoins are sent to the intended recipient, thereby completing the transaction. This server system 38 may be a single server system or the varied functionality required may be broken up over multiple servers.

Thus, in this example, the following steps occur:
1) For any currently owned bitcoins of the user, one of the three encryption keys is stored on the block card 90.
2) One of the three encryption keys is stored on the server system 38.
3) One of the three encryption keys is stored on the data vault.
4) When the user wishes to send bitcoins to another party, be it an individual or a merchant, the user clicks on the button which is marked with the bitcoin indicia, which causes the block card 90 to activate the camera 98 in preparation of scanning a quick response (QR) code.

5) The user scans the QR code of the recipient by using the camera 366 and enters an amount of bitcoins they wish to send if the QR code does not include an amount in its encoding.

6) The user places his or her finger on the fingerprint scanner 94 to authorize the transaction. A central feature is identified comprising a pattern formed by lines connecting four minutiae. Minutiae characteristics and position relative to a center of mass of the central feature, and characteristics of ridges intersecting the pattern lines are obtained from the fingerprint scanner 94, and a digital fingerprint string(s) is obtained.

7) A first cryptographic salt is used to hash the digital fingerprint strings and the resulting first hash is compared to a first hash signature for authentication.

8) If authentic, a second cryptographic salt is used to hash the digital fingerprint strings and the resulting second hash is sent to the server system 38 for authentication. The block card 90 also signs the transaction using its stored encryption key and sends the signed transaction to the server system 38 via the wireless transceiver 18. Assuming successful authorization based on the second fingerprint hash, the server system 38 completes the transaction by signing it with its encryption key and broadcasting the co-signed transaction to the Bitcoin network, thereby transferring the bitcoins to their new owner.

9) To receive bitcoins, the user clicks the button marked with the bitcoin indicia twice in rapid succession.

10) The user enters the amount of bitcoins they wish to receive, and touches his or her finger on the fingerprint scanner 94 to provide authentication as described above.

11) The block card 90 shows a QR code which anyone can use to send the designated amount of bitcoins to the block card user.

12) In order to buy new bitcoins using the block card 90, the user clicks the button marked with the bitcoin indicia three times in rapid succession.

13) The user enters the amount of bitcoins they would like to buy or the amount of fiat currency they wish to convert, and touches his or her finger on the fingerprint scanner 94 to provide authentication as described above.

14) The server system 38 automatically buys the designated amount of bitcoins utilizing funds from a linked bank account.

15) In order to sell bitcoins using the block card 90, the user clicks the button marked with the bitcoin indicia four times in rapid succession.

16) The user enters the amount of bitcoins they would like to sell, and touches his or her finger on the fingerprint scanner 94 to provide authentication as described above.

17) The server system 38 automatically sells the designated amount of bitcoins on a bitcoin exchange and deposits the obtained funds into the linked bank account.

18) In order to log into the web portal, the user may obtain a one-time password using the block card 90. To trigger this, the user may press both buttons at the same time, one button being marked with the bitcoin indicia and the other being marked with the dollar indicia.

19) The challenge is received by the block card 90 through manual keypad input, camera QR code scan, or wireless transceiver.

20) The user touches his or her finger on the fingerprint scanner 94 to provide authentication as described above, and the one-time password appears on the display screen 92 of the block card 90 or is transmitted directly to the server system 38 using the wireless transceiver 18.

21) In order to utilize the block card 90 as a debit card, the user presses the button marked with the dollar indicia, thereby preparing the block card 90 for use as a debit card.

22) The user touches his or her finger on the fingerprint scanner 94 and pending authorization from the block card 90 and from the server as described above, the block card 90 is now able to function as a debit card.

23) The user utilizes the block card 90 as a debit card, and the proper amount of bitcoins are automatically liquidated by the server system 38 in order to pay for the transaction in dollars instead of bitcoins.

In addition to storing a biometric hash data (e.g., the first hash 30, first hash signature 32, and the second hash 36) for verification, the biometric hash can also be used to improve security by transforming the biometric hash to create a cryptographic key. The resulting cryptographic key can be either a symmetric key or an asymmetric key, and can be used for both signing and encryption. And because the cryptographic key is derived from biometric identity information, such cryptographic key can be closely tied to a user's identity with a good degree of cryptographic strength. There are multiple ways to perform this transformation, two of which are described below. In both examples, the cryprotraphic key is used to associate a user's biometric data, such as a fingerprint, to a user's "identity private key," such as a PGP private key or a bitcoin address private key.

The first possible method for transforming a biometric hash into a cryptographic key is to have an "identity private key" associated with a user's identity stored on a local device or remote server. This identity key can be encrypted with all of the hashes a user generated when enrolling their biometric data, using a separate encryption salt than used to do the verification. When the user then scans his fingerprint, and a valid scan has been verified by comparing to the stored hash, a second hash is made with the alternate source and this value used to decrypt the identity private key which can then be used to sign or encrypt an arbitrary piece of data. This method is well suited for use in a trusted computing environment where the computing system can be trusted to discard the identity private key after decryption and use. This methodology requires only one verification step to authenticate an arbitrary piece of data, such as a signed document.

Another possible method for transforming a biometric hash into a cryptographic key is to first create a root "identity private key" associated with a user's identity and store it on a local device or remote server. For each biometric hash created as part of the enrollment process, a private key is generated from the hash. Possible generation methods could be using the hash directly, using another hash, or using an iterated hash function commonly used for key stretching in cryptography, such as the PBKDF2 function. Once the private key for a single hash is generated, its corresponding public key can be signed with the root "identity private key" and that signature can be broadcast to some signature storage location. This associates the biometric hash keys with the "identity private key" so it is clear, anything signed by the biometric keys have the authority of the underlying "identity private key." In addition, this provides some additional security because once those public keys are signed by the "identity private key," the biometric hash keys can be used for future signing, thus meaning fewer uses of the "identity private key" and thus less chance for compromise. Any document or data that is to be secured by this method would be signed with the private key generated from biometric hash from the user's scan. When this document or data then needs to be verified publicly, the biometric hash public key can be used to verify the document as having been signed by the corresponding biometric hash private key and that biometric hash public key can be verified as belonging to the individual represented by the "identity private key" by doing a signature verification using the "identity public key."

This method is well suited for use in a computing environment where the computing system does not need to be trusted after the enrollment stage. Subsequent computing systems performing the verification need never decrypt the key for verification and thus, need not be trusted to discard the private key after decrypting. As such, this method works very well for distributed systems, such as block-chain based systems. The disadvantage of this system is that it requires additional verification steps to authenticate the signed document or piece of data. However, in large, distributed systems, an extra verification step or two is generally not an issue for performance since each system is not tasked with doing a large number of transactions simultaneously, as is often the case with non-distributed systems.

EXAMPLE 3

For some fingerprints it is difficult to find the central feature in a consistent and repeatable manner. Since the generation of a consistent and repeatable hash is dependent on using the relative locations of minutia as compared to the central feature, this creates a prospective problem generating the hash. For these fingerprints, the best central feature will be found from the fingerprint scans supplied for the registration process. "Best" is defined as a combination of weighted scores relating to repeatability in the registration scans (the more often it is selected in the registration scans, the higher the score), the closeness to the center of the fingerprint scans (the closer to the relative pixel center of the scans, the higher the score), and the number of minutia within the prescribed number of ridges (the more minutia, the higher the score). Once a candidate central feature is selected, then a small portion of fingerprint ridges are stored in an encrypted image. This becomes a correlation hint for future scans. When the algorithm detects the correlation hint, the algorithm will first use the hint to locate that corresponding location within the new scan. Once found, the center of this hint will become the point of the central feature and the direction of the +Y axis of the hint's pixel map, as it correlates to the new scan, will be the direction of the central feature for use in the general algorithm.

To generate the correlation hint, once the candidate central feature is located, a small pixel map is created using the fingerprint ridges that surround the candidate central feature. The center of the small pixel map corresponds to the center point of the central feature and the pixel map is made large enough to include two ridges out from the central feature. This ensures enough information for getting a good correlation on future scans without storing enough information to generate a synthetic fingerprint should the hint ever be decrypted. The pixel map is generated such that the +Y axis of the pixel map correlates to the orientation of the candidate central feature. Once generated, the correlation hint is checked against the other supplied registration scans to make sure that the central feature can be found in a consistent and repeatable manner. If the central feature cannot be found on a consistent basis, then the next best candidate central feature is chosen from the weighted score list, a new hint generated, and that new hint tested against the other supplied registration scans. If the entire list of candidate central features is exhausted without a good match, then the algorithm will use the center of the first registration scans. Since a central feature is normally a ridge or a pattern, the algorithm will normally find the ridge or pattern closest to the actual center pixel if the center pixel is not an actual ridge. The hint will be orientated such that the +Y axis of its pixel map aligns with the +Y axis of the pixel map of the fingerprint scan. This candidate will then be tested against the other supplied registration scans for whether the candidate can be found in a consistent and repeatable method. If not, the algorithm then attempts this same approach with the next supplied registration scan in the list. If the algorithm exhausts all of the supplied registration scans without finding a central feature that can be consistently and repeatably located in the other registration scans, then an error condition is generated indicating that the algorithm was unable to generate a fingerprint hash from the supplied registration scans.

To use this hint when generating hashes in general use, the fingerprint hash generation flow is modified as follows. The algorithm first checks to see if there is a correlation hint present. If not, the algorithm then searches for a central feature, and upon finding the central feature, uses the central features' center point and orientation for the main algorithm. If the correlation hint is present, the algorithm decrypts the hint to get the original pixel map of the first few ridges of the central feature and uses an industry standard correlation method to find the corresponding location and orientation on the fingerprint scan. The correlation point of the center of the hint's pixel map is then considered the center point of the central feature and the correlated direction of the +Y axis of the hint's pixel map is then considered the orientation of the central feature and these two values are used for the main algorithm.

In addition to fingerprints that create difficulties for finding the central feature, some individual fingerprints do not have a large enough number of minutia within the prescribed number of ridges out from the central feature. When this is the case, the resulting hash will not have enough elements and therefore not have enough entropy to prevent brute force methods of generating the hash. To overcome this, the prescribed number of ridges to check can be made an adaptive value, increasing as necessary in order to achieve the proper amount of entropy. To accomplish this, the registration algorithm can generate the hash using the standard prescribed number of ridges—for the preferred embodiment, a ridge count of eight is used. The number of minutia are counted and if that count does not meet the minimum number for sufficient entropy, then the ridge count can be increased by one and any additional minutia added to the list. Once the list is large enough that the minimum number has been achieved, that corresponding ridge count can be stored as a ridge count hint for future use.

This algorithm can also be used to reduce the number of ridges checked. In the event the minutia count exceeds a maximum number of minutia, then the ridge count can be decreased by one and those minutia corresponding to the highest ridge count taken off the list. If the new minutia count is between the minimum and maximum minutia counts, then this ridge count value can be used. If the new minutia count is below the minimum minutia count, then the previous ridge count value is used. If the new minutia count is still above the maximum minutia count, then the count is decremented again and the test begun anew. In the preferred embodiment, the minimum minutia count is 16 and the maximum minutia count is 32.

While it is possible to alleviate the need for this adaptive approach by simply selecting a larger prescribed ridge count, that is not preferable since high ridge counts can cause the hash to have decreased repeatability since for the hash to work, you need to properly locate the ridge count, orientation, and relative position of every minutia within those ridge counts. If the finger is slightly rolled when scanning, then it is possible that a few minutia will not be scanned and thus the hash generation will fail. It is for this reason that the prescribed ridge count should be chosen as a number that works for the majority of fingerprints and allow the adaptive algorithm to increase or decrease the ridge count such that the ridge count produces a minutia count that falls within the optimal range between the minimum and maximum minutia counts.

To use this adaptive method when generating hashes in general use, the fingerprint hash generation flow is modified as follows. The algorithm first checks for the presence of a ridge count hint and if present, uses that number for the count of ridges to check for minutia. If the ridge count hint is not present, the algorithm uses the prescribed ridge count. Alternatively, the fingerprint hash registration process can always store the ridge count and thus the fingerprint hash generation algorithm can always read the ridge count and use it for the main algorithm.

There might be some concern that the presence of these hints could be used as a means to short-circuit the hash generation process by altering these values upon input to the algorithm, for instance, decreasing the ridge count to zero thus creating a very low entropy hash. However, it should be noted that during the fingerprint hash registration process, the hints are not used, but instead are generated and the resulting hash generated is done using these generated values. This generated hash is then returned from the registration process to check future fingerprint scan hashes. Thus, if the number of ridges checked is changed, the resulting number of minutia included in the hash generation algorithm changes and thus the resulting hash generated from the new scan will not match the stored hash.

In addition to the adaptive method for producing variable length strings for hashing, this approach can also be used to create a fixed length string for hashing. To create a fixed length string for hashing, start with a standard ridge count and collect, sort and count all of the minutiae descriptor strings. If the minutiae count meets or exceeds the desired number of minutiae, then the descriptors are sorted and the desired number of minutiae string descriptors are selected off the front of the list. If the desired minutiae count has not been reached, then additional ridges are scanned for minutiae and added to the sorted list until the minutiae count meets or exceeds the desired minutiae count. To ensure the same minutiae are selected each time, in one embodiment, the sorting algorithm needs to use a precise ordering of the minutiae descriptors starting with the ridge location as the top priority. In one embodiment, the sorting priority would be done by order of priority: (1) the ridge count the minutiae appeared in, (2) the type of minutiae, such as end point or bifurcation, (3) the octant number the minutiae appeared in, and (4) the orientation value of the minutiae. It is theoretically possible to have two minutiae with the exact same sorting priority. For instance, if there are two short ridge sections on the fourth ridge in the NE octant, you could see two end ridge minutiae, both on the fourth ridge, both in the NE octant, and both in the same orientation. In this case, they would have the same descriptor string and so it would not matter from a hashing standpoint which one appeared first in the composite string since both would add the same descriptor string to the growing string.

EXAMPLE 4

Another adaptive algorithm that can help with problematic fingerprints would be applied when it is found that there are a large number of border cases with regards to the octant and/or orientation of the minutiae. As described in the main algorithm, if two hash strings appear with regularity from the registration scans due to a boundary condition, then both strings can be stored. However, if there are numerous boundary conditions, then there can be a large number of unique hash strings generated, either resulting in no repeatable scans in the registration scans or resulting in more repeatable scans than the system wishes to store. In some cases, the system may want to store a single repeatable scan. In either of these cases, this example of the algorithm needs to be adaptive to deal with boundary cases.

One solution that can be employed is to examine the resulting minutiae descriptor strings from the component minutiae in each of the composite descriptor strings prior to hashing during the registration process. Boundary conditions will appear as minutiae that have the same type, ridge count, and an octant location or orientation that are near one of the boundaries between octants/orientations. For each of these, a mask can be created with information indicative of which two octants/orientations the minutiae sits on a boundary for. For instance, sitting near the boundary between E and NE octants, or oriented near the boundary between a N and NW orientation. Associated with the mask or masks would be the other descriptor information of the minutiae such that it could be located. To help obscure that information, instead of storing the actual descriptor information, the algorithm would store the composite string location of the first instance of a minutia that has the same initial descriptor information. In one embodiment, this is why the sort order priority was selected with the ridge count first and the minutia type second, as described above. It puts the minutiae in the correct order, even if there is a boundary condition that might shift it slightly in the order, however, it would remain in the same overall position relative to the other minutiae with the same ridge count and minutia type.

When these boundary conditions are located, in this example, the string descriptor for that minutiae would always use the smaller of the two possible octants/orientations found at the boundary and the boundary hint would be stored alongside the resulting hash such that on subsequent scans, the boundary hints could be used to ensure that boundary minutiae generate a consistent descriptor string. For instance, using the above two examples, on a subsequent scan, if a minutiae is detected to have an octant or orientation that lies along a boundary, the two possible orientations are associated with that descriptor string when building the composite string. When done building the composite string, the stored hints are searched to see if there is a boundary hint that matches the minutiae in question. If present, and the border condition matches, then the descriptor string for that minutiae is checked to make sure the minutiae's octant/orientation value is the lower of the two boundary values and if the minutiae's octant/orientation value is not, then the string is changed such that minutiae's octant/orientation value is. If a string descriptor has the boundary condition tag but no corresponding boundary hint is found, then the descriptor string is left unmodified and contains whichever octant/orientation this minutiae mapped to on this scan. This can occur when the octant/orientation is just far enough away from the boundary to be sometimes within the boundary condition and sometimes not. That generally means that the minutiae is just fine to be included as the minutiae is on the very edge of what is considered the boundary area.

Another way to deal with these boundary values is to mask the boundary values out entirely. A higher fidelity location can be stored in the hint to say, "Mask out the minutia found here," such that on subsequent scans, the descriptor strings from those problem minutiae are not added to the composite string altogether. While the higher fidelity location stored in the hint indicates there is a minutiae at that location, the hint does not give any indication of the type of minutiae or its orientation and is only there for the problem minutiae, and as such preserves the original goal of being able to store a hash of the fingerprint data in such a way that the original fingerprint cannot be recreated or even simulated in a manner that would fool fingerprint scanners.

A third method for dealing with these boundary values is to not store any hint but instead, during the registration scan, pick the resulting string that appears the most often—this could be as few as twice. Then, when a subsequent scan is performed for checking against the registered fingerprint hash, the algorithm tags any minutiae that lie in the boundary area of an octant or orientation boundary, storing both possible values as well as how close they are to the boundary itself. For instance, if one measures 3.99 and is therefore near the 3:4 boundary, it is considered closer than something say 3.95 or 4.04, both of which would be on the 3:4 boundary. In this first case, the value 3 would be used, with 4 as a backup. For the third example above, the value 4 would be used with 3 as a backup. Then, if the hash of the composite string fails to match the locally stored hash comparison string, the algorithm goes through any of the boundary minutiae, starting with the smallest distance to boundary first and toggles that minutiae's initial boundary value to the other boundary value within the composite string and creates a new hash using this new value for this minutiae, checking the new hash against the locally stored hash comparison string. If the new hash matches, the algorithm is done. If the new hash does not match and there are other boundary minutiae, the algorithm then toggles the original value back and toggles the value of the next boundary minutiae and tests again. In this manner, the algorithm essentially counts in binary hitting every possible combination of boundary values. Using the following boundary conditions: 3.99, 2.04, and 5.95, the algorithm would test the following combinations: 3-2-5, 4-2-5, 3-1-5, 4-1-5, 3-2-6, 4-2-6, 3-1-6, and 4-1-6. If after all 8 combinations (for 3 boundary minutiae) there has not been a match of the resulting hash, then the fingerprint is considered to have not matched. Once the algorithm has found a combination that produces a hash that matches the local string, then the correct combination string would be rehashed using the "remote salt" and the resulting hash would be sent to the remote server system 36 for verification.

Each of these solutions have certain advantages and disadvantages. The problem with the solutions that use a boundary hint is that they provide some information about the actual minutiae in the fingerprint, albeit only a few out of a much larger number. In addition the boundary hints also reduce the entropy of the entire system for someone trying a brute force attack to generate the composite string since a few of the positions are known. The problem with the third method is it could become computationally intensive if the fingerprint has a large number of boundary values. By sorting the boundary values such that the smaller values are toggled first, this version of the algorithm hopes to address the computationally intensive aspect of this algorithm by hopefully finding the correct string within the first few strings tested. It may be desirable to set an upper limit on the number of boundary conditions that will be toggled to prevent an undue number of iterations. However, it should also be kept in mind that if the scan is looking for 20 minutiae and if the boundary area is defined as being within 5% of an octant or orientation boundary, that means on average, only 2 minutiae will fall within a boundary condition and an even smaller number will be within 1% of an octant or orientation boundary. Because this third method maintains full entropy and no disclosure of the minutiae, and is limited in terms of the likelihood of being too computationally intensive, the third method is the solution used in the preferred embodiment of this disclosure.

From the above description, it is clear that the inventive concept(s) disclosed herein is well adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein and defined by the appended claims.

What is claimed is:

1. A biometric identification system, comprising: a biometric sensor operably connected to or included within a smart device, the smart device comprising a processor, and non-transitory digital storage element coupled to the processor, the non-transitory digital storage element storing logic that when executed by the processor causes the processor to:
   activate the biometric sensor to scan an aspect of a user's physiology, identify a predominant reference point that can be found consistently and repeatedly in subsequent scans, and at least three minutiae of the user's scanned physiology with at least one minutiae being a boundary minutiae positioned between at least two orientation boundaries, and generate a digital biometric string(s) indicative of a position of each of the at least three minutiae relative to the predominant reference point;
   combine the digital biometric string(s) with a first cryptographic salt stored in the digital storage element to generate a first hash;
   compare the first hash to a first hash signature and boundary hint stored in the non-transitory digital storage element and determine if the first hash represents an authentic biometric scan, the boundary hint indicative of boundary minutiae positioned between the at least two orientation boundaries; and
   authenticate the user subsequent to determining the first hash represents the authentic biometric scan.

2. The biometric identification system of claim 1, wherein the smart device includes a transceiver, and wherein the logic, when executed by the processor causes the processor to:
   combine the digital biometric string(s) with a second cryptographic salt stored in the non-transitory digital storage element to generate a second hash when continued verification is required; and enable the transceiver to transmit the second hash to one or more servers.

3. The biometric identification system of claim 1, wherein the biometric sensor comprises a fingerprint sensor producing a fingerprint scan, and the digital biometric string comprises a digital fingerprint string(s).

4. The biometric identification system of claim 3, wherein the fingerprint sensor comprises a swipe fingerprint scanner.

5. The biometric identification system of claim 3, wherein the fingerprint sensor comprises a static fingerprint sensor.

6. The biometric identification system of claim 3, wherein the predominant reference point comprises a central ridge.

7. The biometric identification system of claim 6, wherein the central ridge is determined by converging normals to ridge swirls present in the fingerprint scan.

8. The biometric identification system of claim 6, wherein the central ridge is selected using a method selected from the group consisting of a hierarchical method and a center of mass method.

9. The biometric identification system of claim 3, wherein the digital fingerprint string(s) indicative of a position of each of the at least three minutiae relative to the predominant reference point includes information selected from minutia distance from the predominant reference point, minutia type, minutia direction from the predominant reference point minutia orientation, and combinations thereof for each of the at least three minutiae.

10. The biometric identification system of claim 9, wherein the minutia distance from the predominant reference point is determined by counting ridges between the minutia and a center of the predominant reference point.

11. The biometric identification system of claim 9, wherein the at least three minutia in the digital fingerprint string are in a range of from about 10 to about 40 minutiae.

12. The biometric identification system of claim 9, wherein the at least three minutia in the digital fingerprint string are in a range of from about 16 to about 32 minutiae.

13. The biometric identification system of claim 3, wherein the predominant reference point comprises a pattern resulting from six connecting lines connecting four minutiae.

14. The biometric identification system of claim 13, wherein the pattern is a kite pattern and an angle of intersection of two connecting lines that cross each other is stored in the non-transitory digital storage element.

15. The biometric identification system of claim 13, wherein the pattern is a pyramid pattern having three connecting lines radiating from one of the minutia, and wherein at least two angles between the three radiating lines are stored in the non-transitory digital storage element.

16. The biometric identification system of claim 13, wherein the digital fingerprint string(s) comprises data indicative of a position of each of the four minutiae relative to a center of the pattern.

17. The biometric identification system of claim 16, wherein the digital fingerprint string(s) additionally comprises data indicative of a position of each ridge crossing each connecting line.

18. A secure device, comprising:
a biometric sensor;
a transceiver;
a processor coupled to the transceiver and the biometric sensor;
a non-transitory digital storage element coupled to the processor and storing logic that when executed by the processor causes the processor to:
activate the biometric sensor to scan an aspect of a user's physiology, identify a predominant reference point that can be found consistently and repeatedly in subsequent scans, and at least three minutiae of the user's scanned physiology with at least one minutiae being a boundary minutiae positioned between at least two orientation boundaries, identify the boundary minutiae and store at least two values associated with location of the boundary minutiae relative to at least one orientation boundary; and generate a first digital biometric string and a second digital biometric string with each digital biometric string indicative of a position of each of the at least three minutiae relative to the predominant reference point that can be found consistently and repeatedly in subsequent scans;
combine the first digital biometric string with a first cryptographic salt stored in the non-transitory digital storage element to generate a first hash;
combine the second digital biometric string with the first cryptographic salt to generate a backup hash;
compare the first hash to a first hash signature stored in the non-transitory digital storage element and determine if the first hash represents an authentic biometric scan requiring continued verification, of the boundary minutiae positioned between the at least two orientation boundaries;
combine the digital biometric string(s) with a second cryptographic salt stored in the non-transitory digital storage element to generate a second hash when continued verification is required;
enable the transceiver to transmit the second hash to one or more servers; and
authenticate the user using at least one of the first hash and the second hash.

* * * * *

UNITED STATES PATENT AND TRADEMARK OFFICE
CERTIFICATE OF CORRECTION

PATENT NO. : 10,992,664 B2
APPLICATION NO. : 15/940115
DATED : April 27, 2021
INVENTOR(S) : Stephen L. Schultz, David R. Nilosek and John Dvorak Page 1 of 1

It is certified that error appears in the above-identified patent and that said Letters Patent is hereby corrected as shown below:

In the Specification
Column 6, Line 61: After "first hash" insert -- 30 --

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*